(12) United States Patent
Buldhaupt et al.

(10) Patent No.: US 6,419,146 B1
(45) Date of Patent: Jul. 16, 2002

(54) METAL SANDWICH STRUCTURE WITH INTEGRAL HARDPOINT

(75) Inventors: Frederick W. Buldhaupt, Buckley; John R. Fischer, Seattle, both of WA (US); Matthew G. Kistner, Irvine, CA (US); Jeffrey D. Will, Renton, WA (US)

(73) Assignee: The Boeing Company, Seattle, WA (US)

( * ) Notice: Subject to any disclaimer, the term of this patent is extended or adjusted under 35 U.S.C. 154(b) by 119 days.

(21) Appl. No.: 09/610,665

(22) Filed: Jul. 5, 2000

Related U.S. Application Data

(63) Continuation of application No. 09/101,582, filed as application No. PCT/US96/20115 on Dec. 20, 1996.
(60) Provisional application No. 60/010,033, filed on Jan. 12, 1996.

(51) Int. Cl.[7] ................. B23K 20/00; B23K 28/00; B23K 31/02; B21D 31/04
(52) U.S. Cl. ............... 228/193; 228/157; 228/190; 228/161; 228/173.2; 29/890.042; 29/6.1
(58) Field of Search ................ 228/157, 193, 228/161, 163, 173.2, 190; 52/506.05, 782.1; 29/890.042, 6.1

(56) References Cited

U.S. PATENT DOCUMENTS

| | | | | |
|---|---|---|---|---|
| 3,646,981 A | * | 3/1972 | Barnes | 151/41.7 |
| 3,927,817 A | * | 12/1975 | Hamilton et al. | 228/157 |
| 3,996,019 A | * | 12/1976 | Cogan | 29/191.4 |
| 4,013,210 A | * | 3/1977 | Deminet | 228/106 |
| 4,304,821 A | * | 12/1981 | Hayase et al. | 428/593 |
| 4,351,470 A | * | 9/1982 | Swadling et al. | 228/157 |
| 4,509,671 A | * | 4/1985 | Weisert | 228/157 |
| 4,549,685 A | * | 10/1985 | Paez | 228/118 |
| 4,643,933 A | * | 2/1987 | Picken | 428/116 |
| 4,898,756 A | * | 2/1990 | Oefner | 428/34.1 |
| 5,007,225 A | * | 4/1991 | Teasdale | 52/799 |
| 5,024,369 A | * | 6/1991 | Froes et al. | 228/157 |
| 5,070,607 A | * | 12/1991 | Boardman et al. | 29/890.042 |
| 5,116,689 A | * | 5/1992 | Castro et al. | 428/593 |
| 5,118,026 A | * | 6/1992 | Stacher et al. | 228/157 |
| 5,259,730 A | * | 11/1993 | Damlis et al. | 416/96 A |
| 5,431,327 A | * | 7/1995 | Dunford et al. | 228/157 |
| 5,524,406 A | * | 6/1996 | Ragland | 52/406.2 |
| 5,692,881 A | * | 12/1997 | Liebfried | 416/223 |
| 5,723,225 A | * | 3/1998 | Yasui et al. | 428/593 |
| 5,737,954 A | * | 4/1998 | Yasui | 72/60 |
| 5,823,032 A | * | 10/1998 | Fischer | 72/60 |
| 5,994,666 A | * | 11/1999 | Buldhaupt et al. | 219/121.64 |
| 6,030,483 A | * | 2/2000 | Wilson | 156/292 |

* cited by examiner

Primary Examiner—M. Alexandra Elve
Assistant Examiner—L. Edmondson
(74) Attorney, Agent, or Firm—J. Michael Neary

(57) ABSTRACT

A superplastically formed, diffusion bonded sandwich structure having integral metal hardpoints, made by joining two superplastic metal core sheets together into a core pack by welding or diffusion bonding along a pattern of lines which form junction lines between the core sheets when the pack is inflated by gas pressure at superplastic temperatures. Face sheets are laid under and over the core pack and metal inserts are interposed between the face sheets and the core. All of the sheets in the pack are sealed together around an outside peripheral edge to create a gas tight envelope. The pack is heated to superplastic temperatures in a cavity in a die, and the top and bottom face sheets are diffusion bonded to top and bottom surfaces of the metal insert by application of heat and pressure from top and bottom inner surfaces of the die cavity. While at superplastic temperatures, the pack is inflated by gas pressure against inside surfaces of a die to form an expanded metal sandwich structure having integral webs and integral hardpoints formed by the metal insert. After forming, the gas pressure is reduced to near atmospheric, the die is opened and the part is removed from the die.

41 Claims, 16 Drawing Sheets

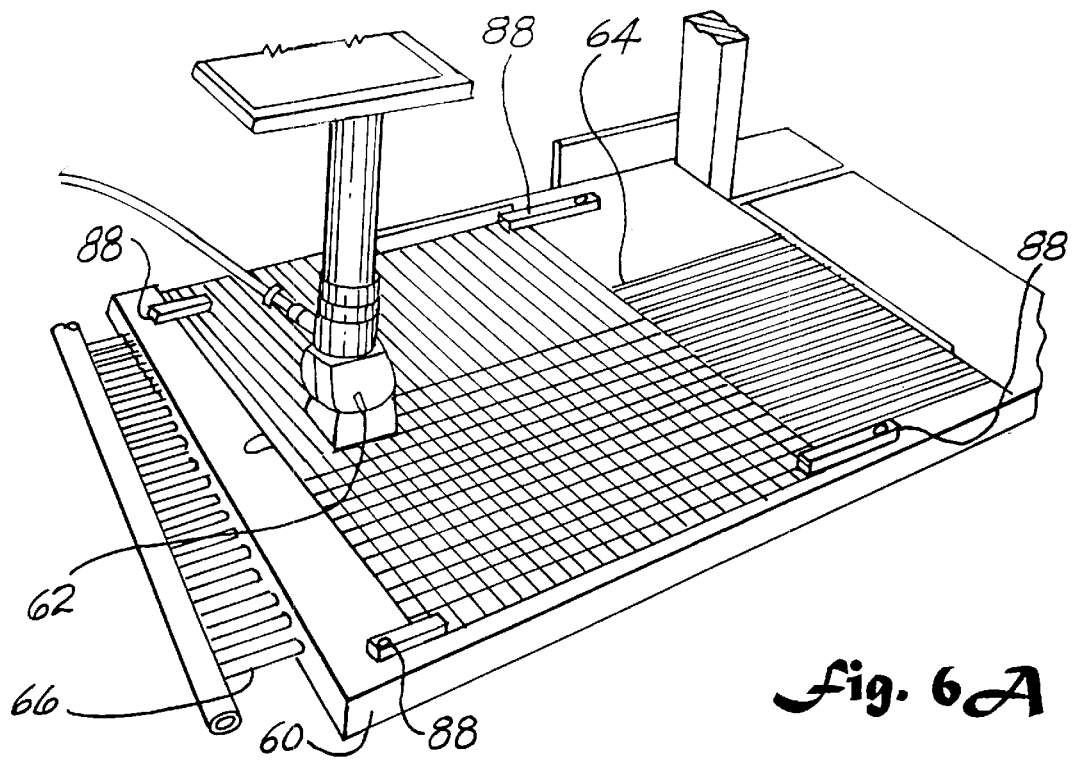
fig. 6A
fig. 6B
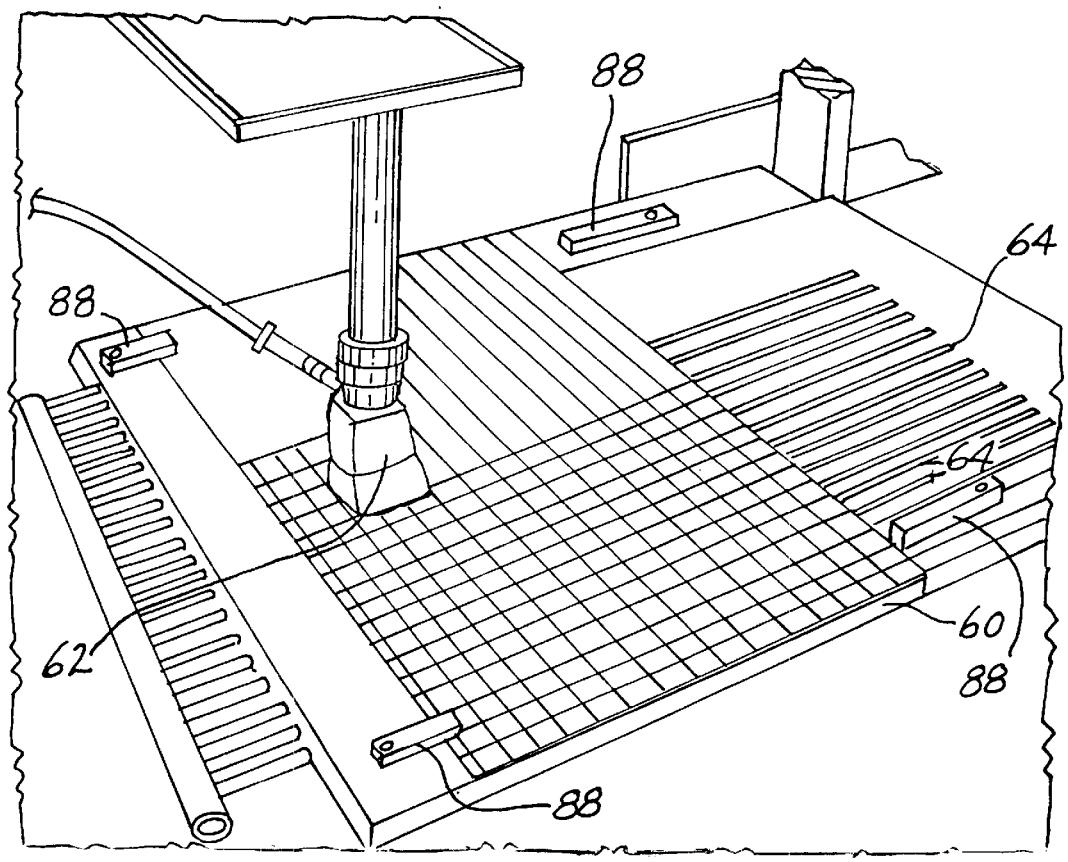

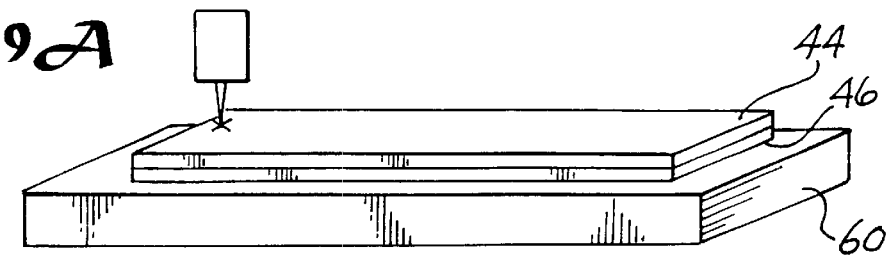
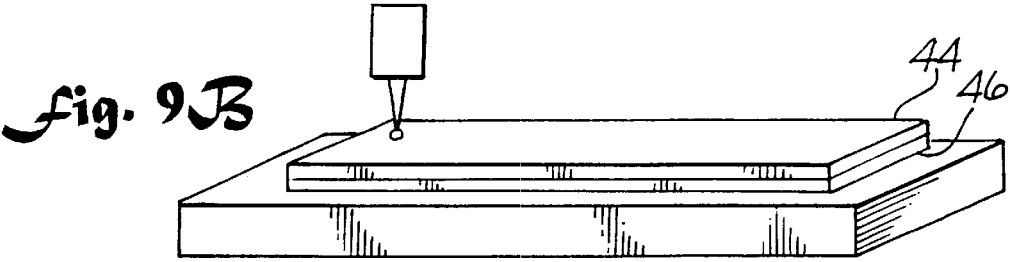
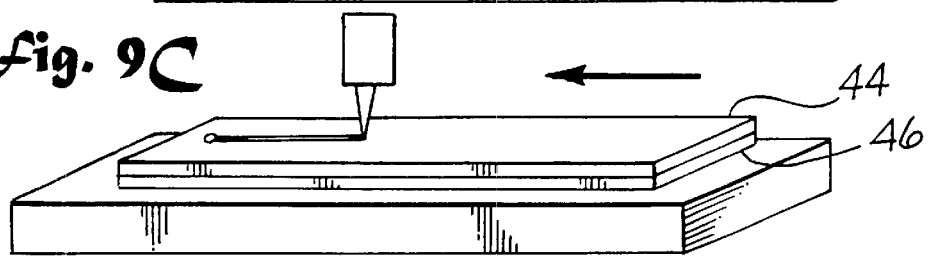
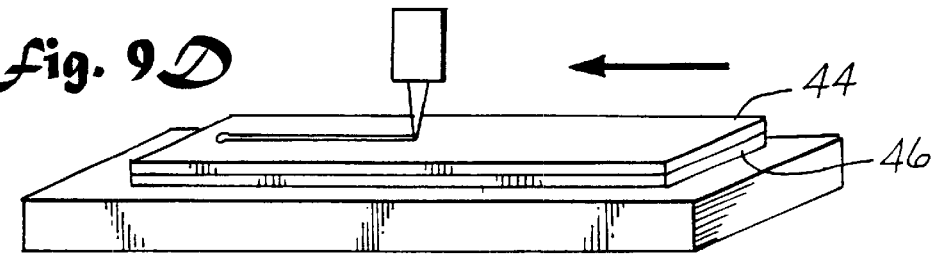
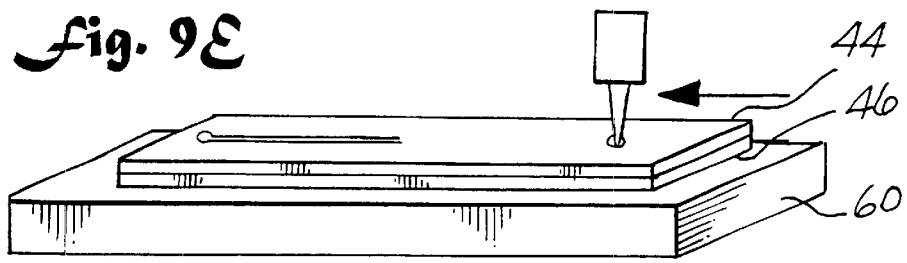

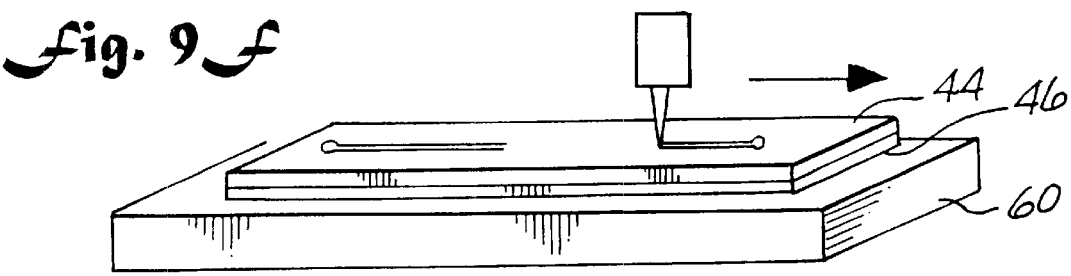
fig. 9F
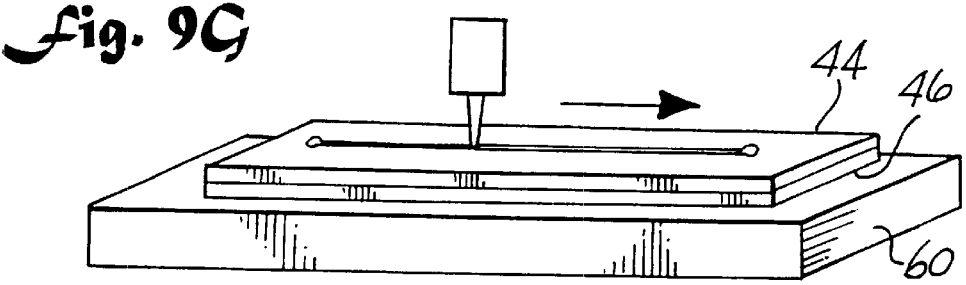
fig. 9G
fig. 10
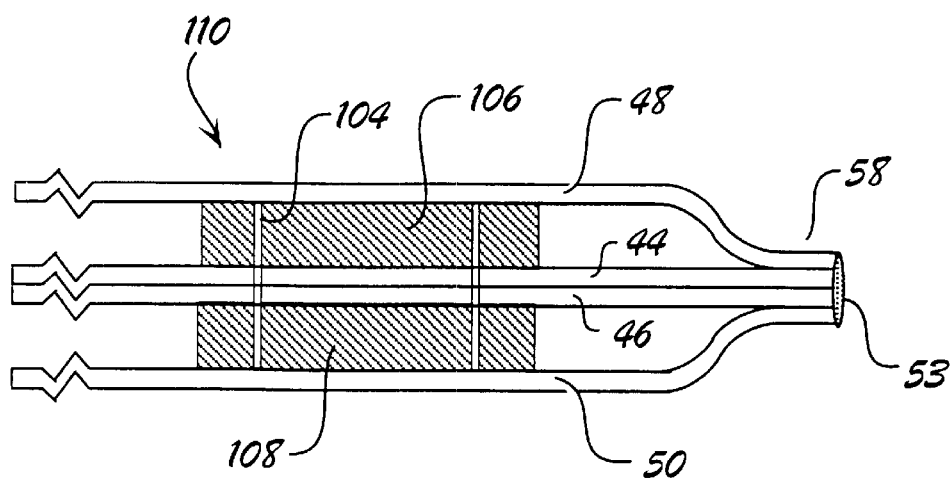

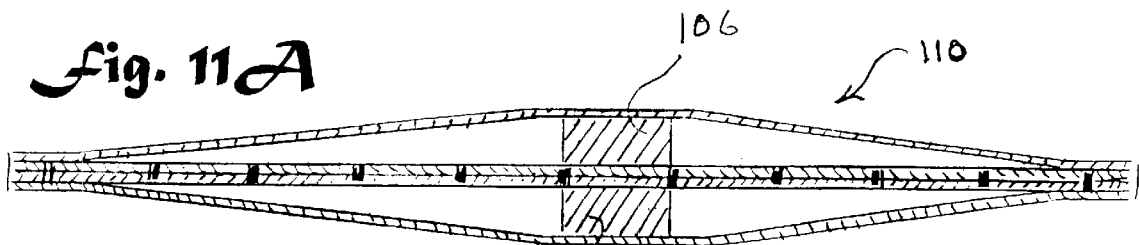
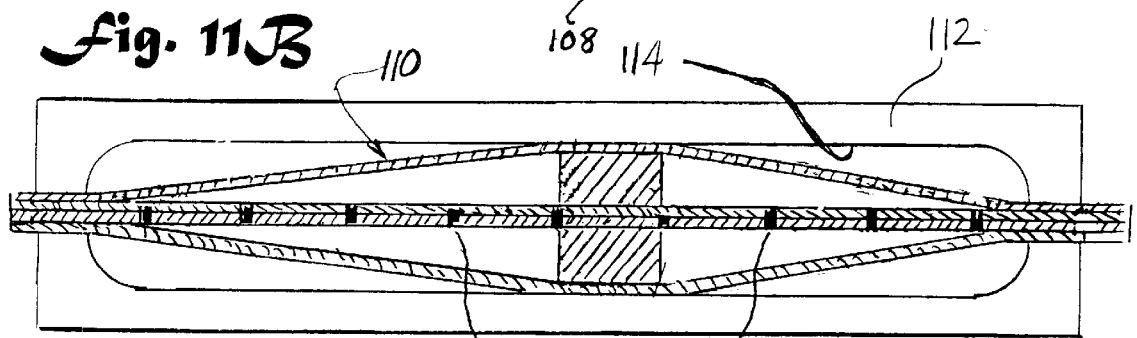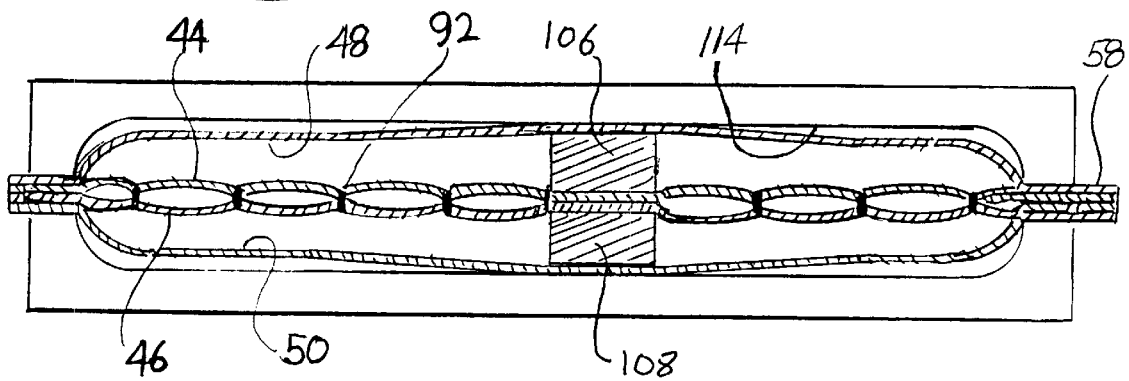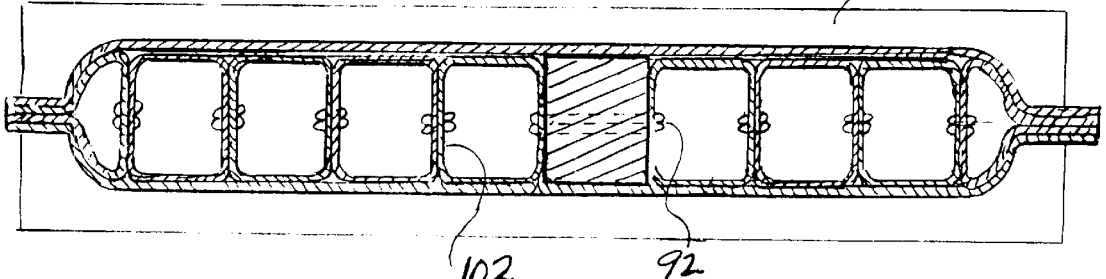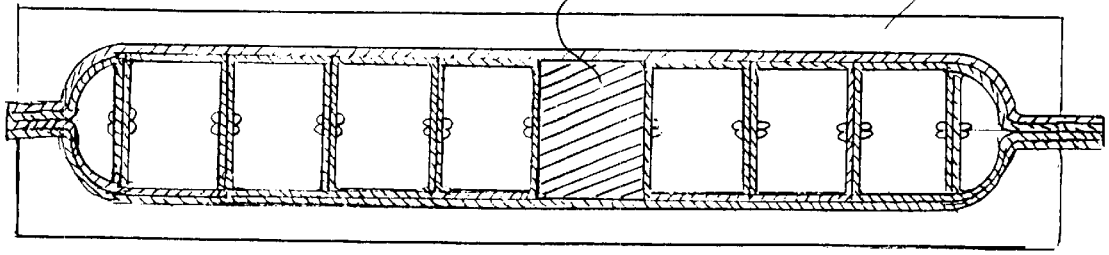

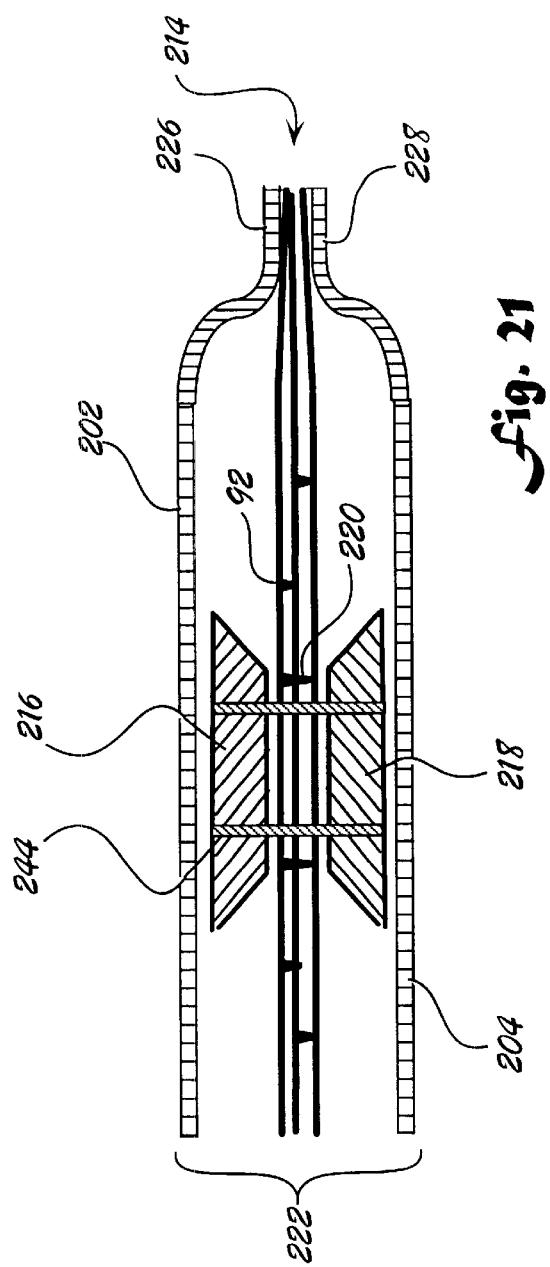
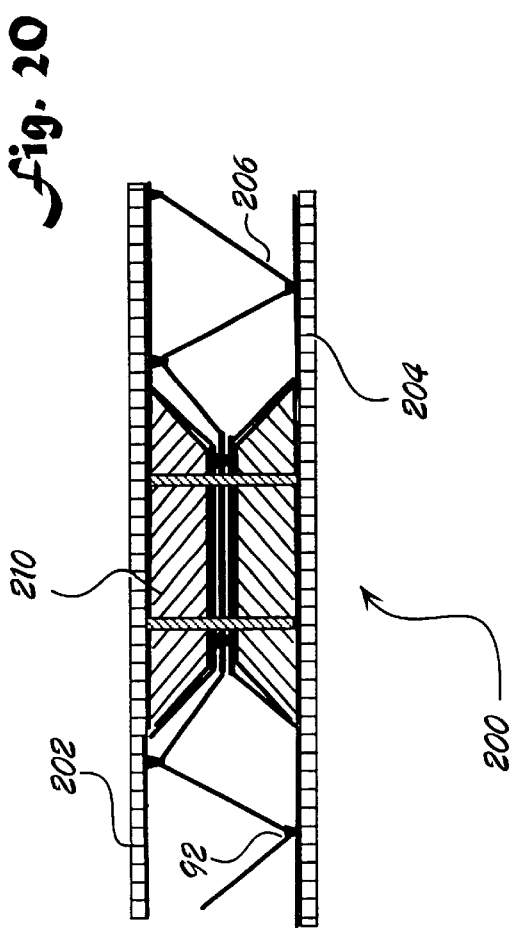

METAL SANDWICH STRUCTURE WITH INTEGRAL HARDPOINT

This application is a continuation of Ser. No. 09/101,582 filed Jul. 10, 1998, which is a 371 of PCT/US96/20115 filed Dec. 20, 1996 which claimed the benefit of provisional application No. 60/010,033 filed Jan. 12, 1996.

This invention was disclosed in part in Provisional Patent Application No. 60/010,033 entitled "Multisheet Sandwich Structures", filed on Jan. 12, 1996 by Fred-Buldhaupt, Dave Gane, Matt Kistner and Jeff Will.

This invention relates to hardpoints in superplastically formed multisheet sandwich structures, and more particularly to integral hardpoints joined to and joining the top and bottom face sheets of a superplastically formed, diffusion bonded metal sandwich structure by which the sandwich structure can be attached to adjacent structures, pivots, actuators and the like.

BACKGROUND OF THE INVENTION

Multisheet expanded metal sandwich structures made by superplastic forming (SPF) and diffusion bonding have been in use for many years, particularly in the aerospace industry, because of their low cost, good strength and stiffness per unit weight, and high temperature resistance. Various processes for fabricating these structures have been developed in the past, with various degrees of success, and recently these processes have been improved to enable fabrication of these metal sandwich structures with exceptional quality, reliability and efficiency. The new processes are described in Provisional Patent Application No. 60/010,033 entitled "Multisheet Sandwich Structures", filed on Jan. 12, 1996 by Fred Buldhaupt, Dave Gane, Matt Kistner and Jeff Will.

One persistent problem that has been encountered with the use of these metal sandwich structures is connecting them with adequate load transfer capacity to adjacent structure in the assembly of which they are a part. The top and bottom face sheets of the sandwich structure are typically thin titanium sheets which cannot bear the application of concentrated forces in a single point, as would happen if the part were attached by sheet metal screws or bolts or the like. Moreover, the hole that such a fastener would make in the sheet metal would further weaken the sheet metal and facilitate the initiation of cracks in a vibrating or other fatigue environment.

The use of bolts or other fasteners of that type often require the fastener to be tightened into a state of tension to attain a secure, full strength connection. The use of such fasteners with conventional metal sandwich structures is difficult because the necessary tensile preload exerts a crushing force on the sandwich structure which tends to collapse it, damaging the part and losing the necessary fastener preload.

Important applications of metal sandwich structures are in aerodynamic structures in aircraft, missiles and the like. For purposes of aerodynamic efficiency and/or reduced radar cross-section, fastener heads for such structures are often required to be recessed into a counterbore or countersink to lie flush with the surface of the part. However, such recessing of fastener heads is difficult or impossible with conventional fastening techniques for metal sandwich structures.

The "closeout" of a metal sandwich structure is the peripheral edge portion that spans the top and bottom face sheets. It provides an edge seal for the structure and often would be the ideal location for fastening to adjacent structure. However, existing closeout techniques may not provide a structure of the desired shape and strength to serve as a flush edge fastening structure, and may not provide an edge shape with a configuration that matches the configuration of the adjacent structure.

Thus, there has long been an unsatisfied need in the industry for a metal sandwich structure having integral hardpoints that enable the metal sandwich structure to be securely fastened to adjacent structure in a manner that distributes the connection forces evenly to the metal sandwich structure without damage, and providing the possibility of sinking the fastener heads flush with the outside surface of the part.

SUMMARY OF THE INVENTION

Accordingly, it is an object of this invention to provide a method of attaching a superplastically formed, diffusion bonded sandwich structure to adjacent structure. Another object of this invention is to provide a method of making a metal sandwich structure having an integral hardpoint at any desired locations in the structure, by which the sandwich structure can be connected to adjacent structures in the assembly in a manner that evenly distributes forces exerted by the adjacent structure on the sandwich structure. A further object of this invention is to provide a sandwich structure having an integral hardpoint by which the sandwich structure can be connected to adjacent structure in the assembly providing highload transfer capability and fatigue tolerance.

These and other objects of the invention are attained in a superplastically formed, diffusion bonded sandwich structure having an integral metal hardpoint, made by joining at least two superplastic metal sheets together into a pack of three or more sheets by welding or diffusion bonding the two sheets along a pattern of lines which form junction lines between the sheets when the pack is inflated by gas pressure at superplastic temperatures. At least one metal insert is interposed between at least two of the sheets and all of the sheets in the pack are sealed together around an outside peripheral edge to create a gas tight envelope. The pack is heated to superplastic temperatures and the top and bottom face sheets are diffusion bonded to top and bottom surfaces of the metal insert by application of heat and pressure from top and bottom inner surfaces of the die cavity. While at superplastic temperatures, the pack is inflated by gas pressure against inside surfaces of a die to form an expanded metal sandwich structure having integral webs and an integral hardpoint formed by the metal insert. After forming, the gas pressure is vented, the part is cooled below superplastic temperature and is removed from the die.

DESCRIPTION OF THE DRAWINGS

The invention and its many attendant objects and advantages will become better understood on reading the following description of the preferred embodiments in conjunction with the following drawings, wherein:

FIGS. 6A and 6B are two perspective views of a laser apparatus used for laser welding the sheets of the core pack shown in FIG. 4;

FIGS. 9A–9G are schematic perspective views of a process for laser welding used with this invention;

FIG. 10 is a sectional elevation of an edge portion of a pack that is superplastically formed and diffusion bonded to make the part shown in FIG. 1;

FIGS. 11A–11E are schematic elevations of the pack used to make the part shown in FIG. 1, showing several stages in the forming process;

FIGS. 11–19 are sectional elevations showing three stages of a prethinning process used to form the core without excessive thinning at the-corners of the webs;

FIGS. 20 and 21 are sectional elevations showing two stages of forming a truss core metal sandwich structure with a hardpoint in accordance with this invention.

DESCRIPTION OF THE PREFERRED EMBODIMENTS

Figure 1:
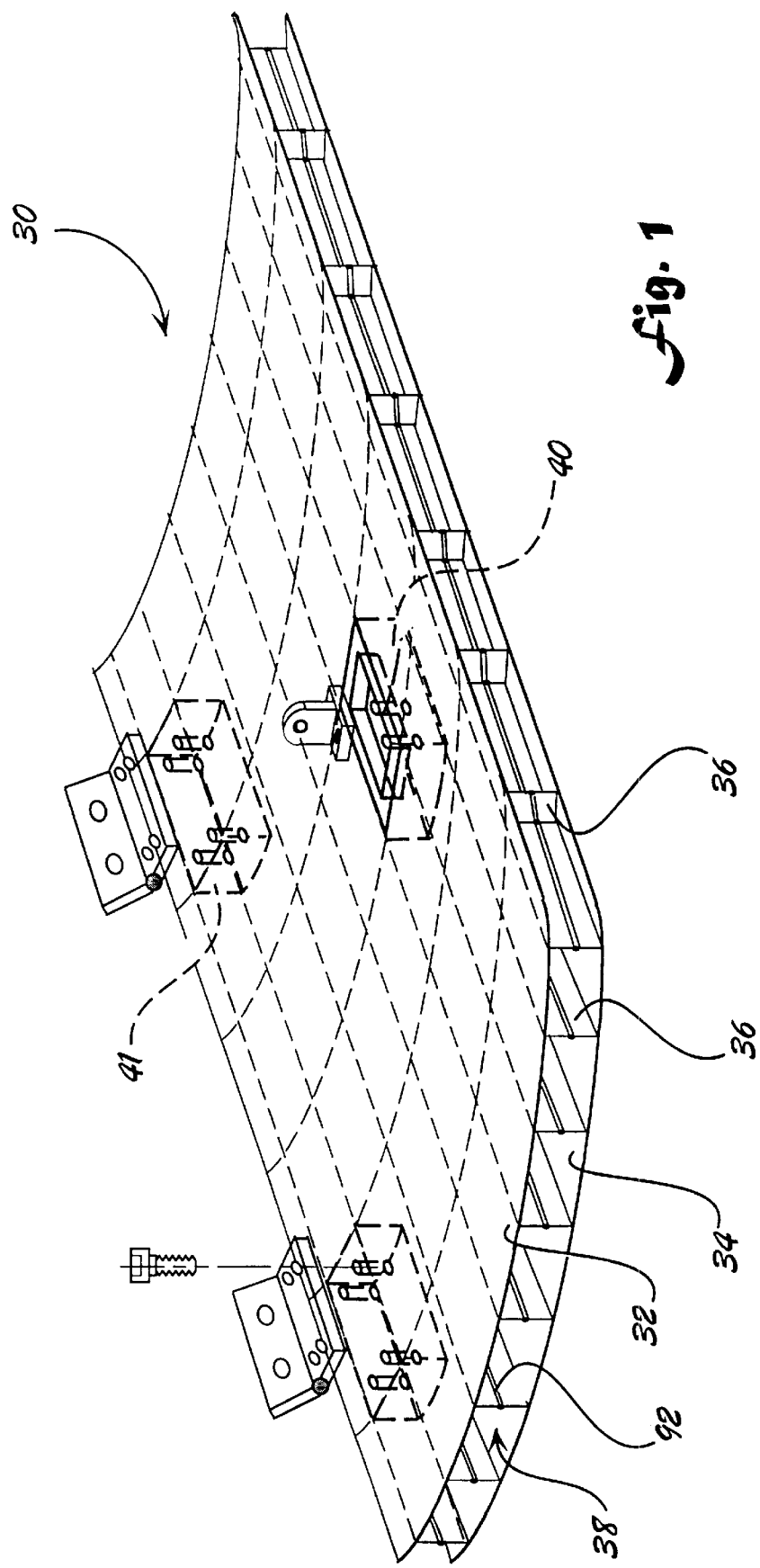
FIG. 1 is a perspective view, partly exploded of a part made of a metal sandwich structure in accordance with this invention.

Turning now to the drawings, wherein like reference numerals designate identical or,corresponding parts, and more particularly to FIG. 1 thereof, a multisheet superplastically formed, diffusion bonded metal sandwich part 30 such as an access port cover or door made in accordance with this invention is shown having a top face sheet or skin 32, a bottom face sheet or skin 34 spaced apart from the top face sheet 32 and defining between them an open interior space. A plurality of webs 36 extends between and is integrally connected to the top and bottom skins 32 and 34, spanning the open interior space therebetween. The webs 36 are preferably arranged as indicated to form a plurality of square cells 38, although cells of other shapes can be made, such as hexagonal cells made with webs made in a hexagonal pattern, three sheet egg crate structures made with off-set circular welds between two face sheets and a center sheet, and other known multisheet expanded metal structure cell designs.

An interior hardpoint 40 is intergally joined to the top and bottom face sheets 32 and 34 and couples the two face sheets for load transfer therebetween and is also preferably (but not necessarily) joined integrally to four adjacent webs in the four sheet square cell structure shown in FIG. 1. As used herein, the term "hardpoint" means a load transferring structure joined to top and bottom face sheets in the sandwich structure by which the sandwich structure can be coupled to other sub-assemblies in the assembly of which it is apart. The hardpoint facilitates the distribution of forces between the sandwich structure and the other sub-assemblies so that the sandwich structure can be connected to and moved relative to the assembly without locally over stressing the sandwich structure at the connection point. Joining the hardpoint 40 to the top and bottom face sheets 32 and 34 and to the webs 36 improves the distribution of the load 20 between the face sheets 32 and 34 and throughout the structure, and it also strengthens the junction between the face sheets and the webs 36 at the location of greatest stress. It can be readily drilled or machined and tapped or threaded for easy, convenient and strong connection to adjacent structures and components.

Several edge hardpoints 41 are integrally joined to the top and bottom face sheets 32 and 34 and to adjacent webs 36. The edge hardpoints 41 can be discrete, separate blocks or they can be a continuous peripheral edge structure, that also forms a closeout of the edge of the metal sandwich part 30, described in more detail below in conjunction with FIG. 15.

The sandwich structure shown in FIG. 1 is made from four sheets of a metal, such as titanium 6-4 alloy, which has super-plastic and diffusion bonding characteristics. Superplastic characteristics include the, capability of the.metal to develop unusually high tensile elongations and plastic deformation at elevated temperatures, with a reduced tendency toward necking or thinning. Diffusion bonding refers to metallurgical joining of two pieces of metal by atomic co-mingling at the faying surface of the two pieces when they are heated and pressed into intimate contact for a sufficient time. It is a solid state process resulting in. the formation of a single piece of metal from two or more separate pieces without a discernable junction line between them, and is characterized-by the absence of any significant change of metallurgical properties of the metal, such as occurs with other types of joining such as brazing or welding. The characteristics of superplastic forming and diffusion bonding are now reasonably well understood, and are discussed in detail in U.S. Pat. Nos. 3,927,817 to Hamilton and 4,361,262 to Israeli.

Figure 2:
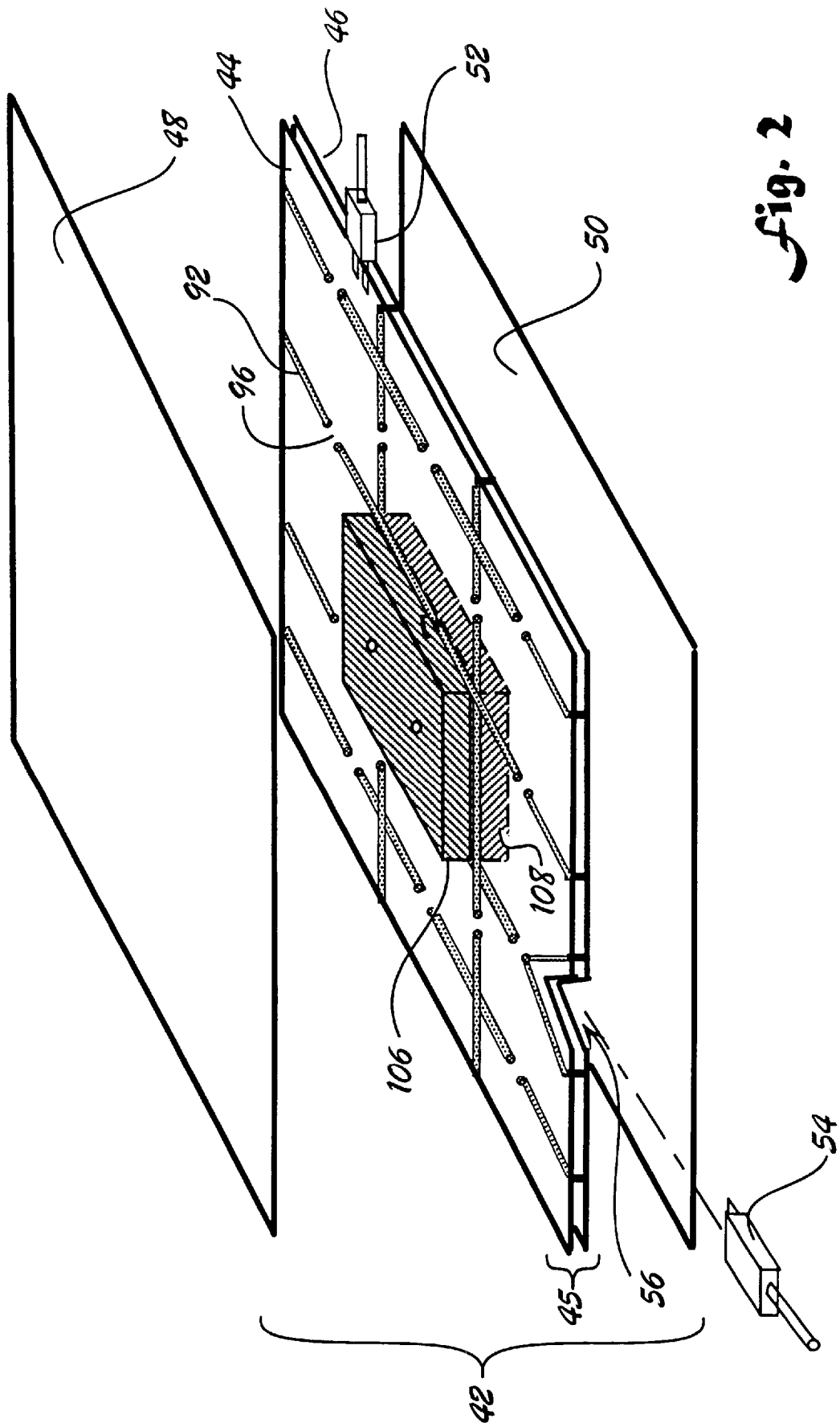
FIG. 2 is an exploded perspective view of the face sheets, the core, and hardpoints that make up the pack before diffusion bonding and superplastic forming into the metal sandwich structure shown in FIG. 1.
Figure 3:
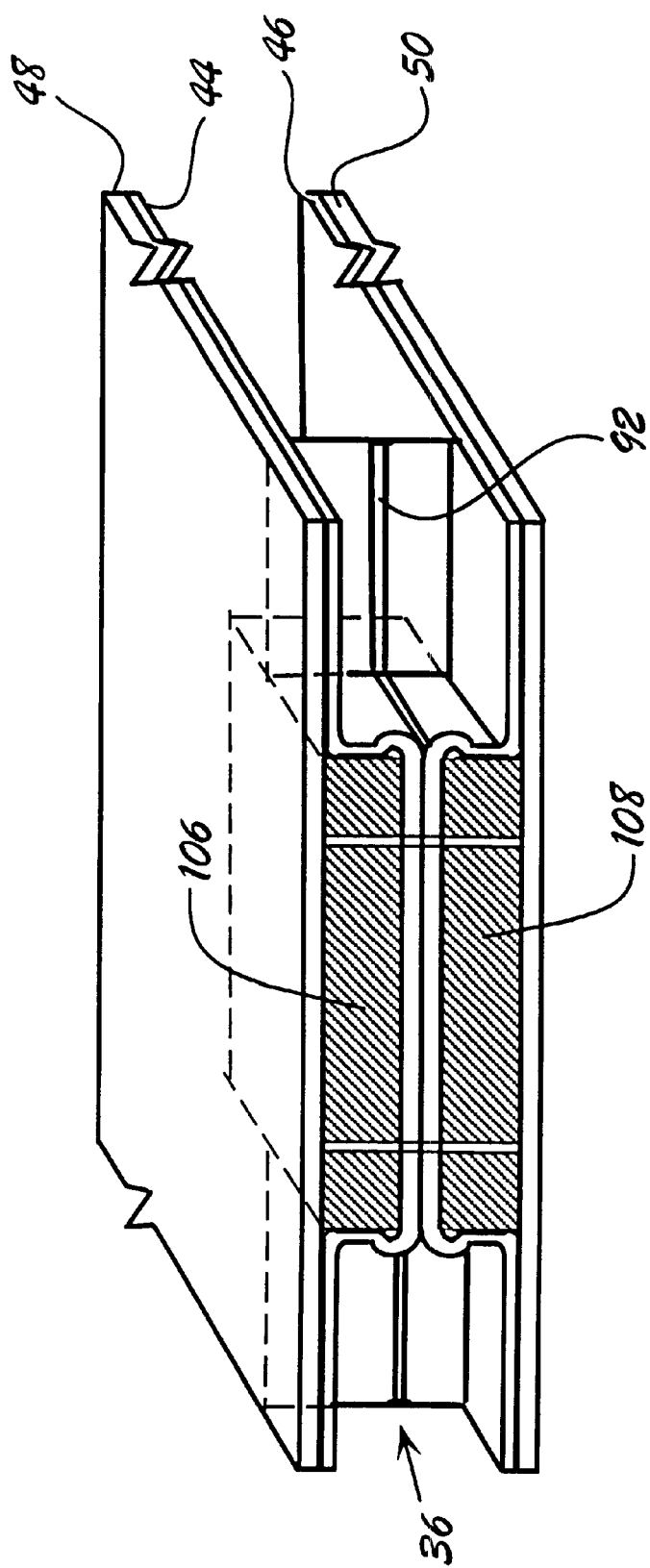
FIG. 3 is a sectional perspective view of a portion of the part shown in FIG. 1.
Figure 5:
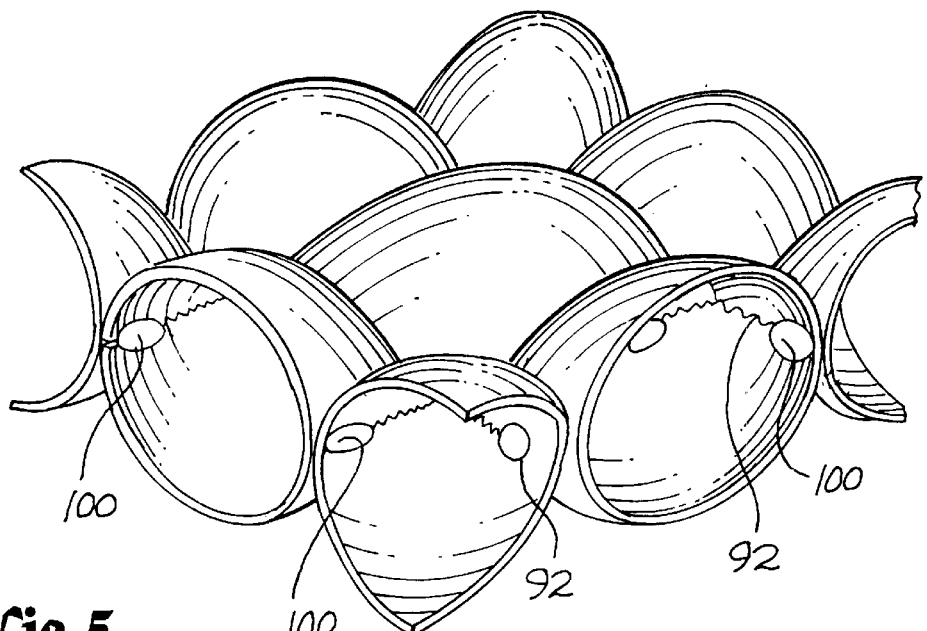
FIG. 5 is a perspective view of a portion of the core shown in FIG. 4 in a partially expanded form.

Turning now to FIG. 2, a stack 42 of four sheets that make up the sandwich structure shown in FIG. 1 is shown in exploded form to show the relative positions of the sheets and the relative positions of the features on and between the sheets. The stack 42 of sheets and hardpoint components of FIG. 2 is shown in FIG. 3 in their configuration following superplastic forming and diffusion bonding. The stack 42 includes two core sheets 44 and 46 and top and bottom face sheets 48 and 50. A core gas fitting 52 is inserted between the two core sheets 44 and 46 that are later welded together to make up a core pack 45. The core gas fitting provides a connection to a forming gas supply system for inflation of the core pack 45 during superplastic forming, wherein the core pack 45 is superplastically inflated as illustrated in FIG. 5 and described in more detail below. An outer envelope gas fitting 54 is inserted into a notch 56 in the core pack 45 communicating with the interior of an outer envelope pack 47 made up by the welding around the periphery of the face sheets 46 and 48. The envelope gas fitting 54 provides a gas flow path into the space above and below the core pack 45 and between the face sheets 48 and 50 for superplastic forming, as described below. The gas fittings 52 and 54 are welded into the stack 42 later in the process.

The sheets 44–50 are cut to the desired size, which is the size and shape of the plan form of the sandwich structure part, plus about ½"–6" (normally about 1"–2") for a flange 58 around the part by which the part may be clamped in the superplastic die, and by which it may be attached into the assembly for which it is intended. After cutting, the sheets are degreased in conventional degreasing apparatus, such as vapor degreasers or may be wiped with acetone to clean the sheets and remove ink markings printed on the sheets by the manufacturer. The sheets are then chemically cleaned by immersion, first in an alkaline bath to remove residual grease and other such contaminants. remaining after the degreasing step, and then in an acid bath, such as 42% nitric acid and 2.4% hydrofluoric acid to remove metal oxides from the titanium alloy sheets. The cleaned sheets are rinsedin clean water to remove residues of the acid cleaner, but residues from the rinsing solution remain on the sheets after removal from the rinsing bath. These residues are removed from the sheets by wiping with a fabric wad, such as gauze cloth, wetted with a reagent grade solvent such as punctilious ethyl alcohol. The sheets are wiped until the gauze comes away clean after wiping. The alcohol evaporates leaving no residue and leaving the sheets free of contaminants that would interfere with a complete and rapid diffusion bond when the conditions for such a bond are established.

When curved panels are being made, it may be desirable to coat one side of one of the core sheets 44 and 46 with a stop-off compound such as boron nitride to prevent unintended diffusion bonding. For large area surfaces, the boron nitride may be dissolved in a solvent such as a mixture of water and alcohol and sprayed with an electrostatic sprayer onto the entire surface area of the one side of the one sheet. The water and alcohol evaporate, leaving a thin even coating of boron nitride on the surface of the titanium sheet. For smaller surfaces, the stop-of may be sprayed from an aerosol can of a solution of boron nitride in an alcohol solution that is commercially available from the Cerac Company in Milwaukee, Wisconsin. The stop-off, if used, is carefully excluded from the region between the sheets 44 and 46 where the hardpoint 40 is to be, since diffusion bonding in that area is desired.

Figure 8:
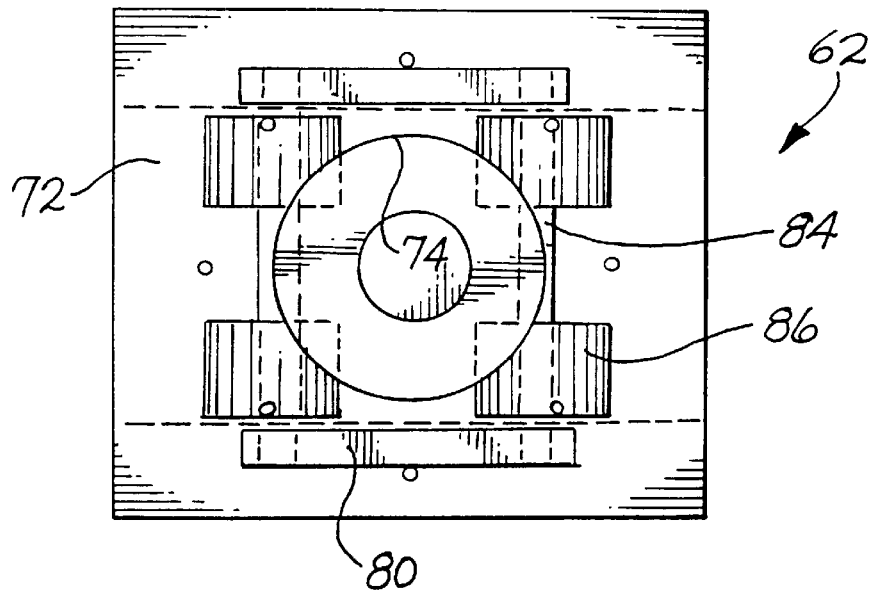
FIGS. 7 and 8 are elevation and plan views, respectively, of a trolley apparatus shown in FIGS. 6A and 6B for pressing the core pack sheets into intimate contact around the weld point during laser welding.
Figure 7:
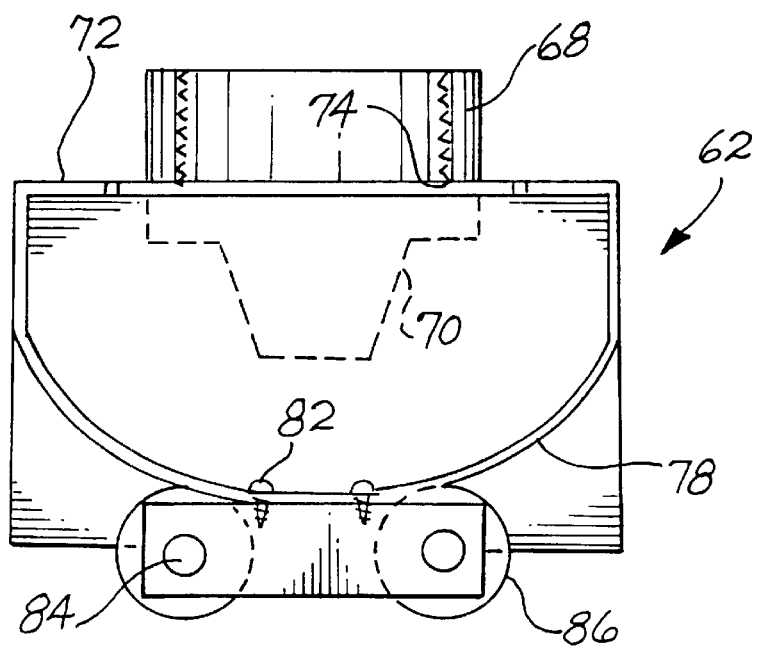

The coated sheet is aligned with and abutted against the other sheet, with the boron nitride coated face facing the other sheet. The two core sheets 44 and 46 are laser welded in the pattern shown in FIGS. 2 and 4 on a laser welding apparatus shown in FIGS. 6A and 6B, purchased from Convergent Energy Corp. in Sturbridge, Mass. The apparatus 59 includes a CNC motion control table 60 on which the sheets 44 and 46 are placed and secured in an 2 aligned stack. A vertically extendable clamping actuator such as a powered plunger is mounted over the table 60. The plunger has a fitting on which a pressure trolley 62, shown in more detail in FIGS. 7 and 8, is mounted for exerting a vertical force on the sheets to press them into intimate contact during laser welding by a laser beam aimed vertically downward through the center of the trolley 62 at the table.

The motion controlltable 60 has a series of parallel grooves 64 opening upwardly in its upper surface, and a perforated tube 66 in each groove. The tubes 66 are connected to a manifold that is connected through a pressure control regulator (not shown) to a supply of argon gas. Argon is admitted through the, tubes to flood the area between the table 60 and the bottom core sheet 46 and displace oxygen and nitrogen from the area. As shown in FIG. 6B, the area of the table 60 not covered by the sheets 44 and 46 may be covered by another sheet which is held down on the table 60 by weights or magnets to prevent aspiration of oxygen from the atmosphere under the sheets 44 and 46. The motion control table 60 is connected to actuators, such as ball screws or the like, to move the table 60 on slides in the X-Y directions on a horizontal plane under the pressure trolley 62.

The laser apparatus (not shown) has an optical system for directing and focusing the laser beam from a laser generator vertically through a threaded connector 68 on the trolly 62. The connector 68 can be loosened to turn the trolley 62 to point in a desired direction and then tightened with a jam nut to remained aimed in that direction. A gas flood nozzle 70, best shown in FIG. 7, is mounted at the lower end of the connector 68 for directing a wide, low pressure stream of helium onto the top core sheet 44 at the weld point where the laser beam impinges the top sheet 44. The helium gas displaces oxygen and nitrogen from the weld point and prevents formation of titanium oxides and nitrides over the laser weldment. Helium is used on the top side instead of argon because it enhances the plasma, whereas argon gas tends to suppress the plasma. The gas flooding technique is used to avoid disturbing the puddle of molten titanium alloy, instead of a high pressure narrow gas jet which is used in laser cutting to displace the molten metal out of the kerf to leave a narrow cut through the metal.

The laser welding pressure trolley 62 has a top plate 72 with a center hole 74 around which the threaded connection 68 is welded. Four sheet metal sides 76 depend from the top plate 72 to provide an enclosure for a cloud of helium to blanket the weld point and surrounding area. A pair of spring loops 78 is fastened one each on each side of the trolley 62, and supports a pair of bars 80 attached, as by screws 82 to the spring loops 78. Two spaced axles 84 are journaled in holes in the bars 80, spanning the bars and supporting cylindrical wheels 86.

In use, a pair of core sheets 44 and 46 are laid on the table 60 and secured thereon by clamps 88. The argon gas is turned on to flood the underside of the bottom core sheet 46 through the tubes 66 with inert gas and displace the oxygen and nitrogen from the region between the table 60 and the underside of the sheet 46. The flow rate will depend on the table size and number of grooves, but for a table 36" square, a flow rate of about 20 cubic feet per hour is sufficient. The controller for the table actuators is programmed with the speed and dwell of the table movement and the. spacing between adjacent welds. The trolley 60 is aligned with the plane of its wheels 86 parallel with the grooves 64 in the table 60, and the vertical motion mechanism on which the trolley 62 is mounted is lowered to engage the wheels 86 with the top surface of the top sheet 44. The vertical extension of the vertical motion mechanism is selected to deflect the spring loops 78 to the extent necessary to produce the desired compressive force exerted by the wheels 86 on the top sheet 44. For example, a 38 pound force can be exerted by two titanium spring loops ½" wide and 3½" long when deflected about ¾". This would be sufficient force to press two titanium alloy sheets 0.025" thick into such intimate contact that an excellent laser weld, with minimal or no porosity, is obtained.

Instead of the spring mounted wheels 86, the trolley 62 may be provided with multiple ball rollers, six rollers for example, each roller mounted on the end of a piston that is spring or gas pressure biased in a cylinder attached to the trolley for use in circumstances where curved weld lines are desired; :especially small radius curves that the wheels 86 would have trouble following.

The helium gas is turned on at a flow rate of about 40 cubic feet per hour and after purging the air from the sheet metal enclosure 76, the laser is turned on with a power of about 650 watts, continuous wave. At the start of the weld, the laser is allowed to dwell for about 0.25 seconds at the beginning point in the weld, as shown in FIG. 9A and FIG. 9B. The dwell time melts a small puddle of titanium and forms a bulbous node 90 at the start of the weld instead of the usual sharp point at the start of a laser weld which can concentrate forces at a small point and initiate a tear in the metal during superplastic forming, which tear could then propagate through the weldment or elsewhere in the material.

After the dwell period, the table 60 is moved as indicated in FIG. 9C to cause the weld point to travel along the sheets 44 and 46 to produce a weld line 92. The speed of travel is selected on the basis of the laser power and thickness of the sheets. For two sheets of titanium 6-4 alloy 0.025" thick and a laser power of 650 watts focused through amlens with a focal length of about 2.5", a table speed of 60 inches/min. produces a complete weld of excellent quality. A longer focal length, on the order of 5", works better for thicker sheets since the length of beam focused to a narrow diameter is longer and the lens itself is removed away from any weld splatter from the point of impingement of the laser beam on the material.

As the weld point passes the midpoint of the weld line 92, the laser power is ramped down gradually until it eventually decouples from the sheets 44/46, as indicated in FIG. 9D. The table 60 is now moved to position the laser point at the other end of the weld line and the laser is turned on again and allowed to dwell as before to create another bulbous node 90 at the other end of the weld line, as indicated in FIG. 9E. After the dwell, the table is moved to move the laser weld point toward the first end of the weld, as indicated in FIG. 9F, and as the laser reaches the weld line midpoint, the laser power is ramped down gradually so that the laser welds back over the portion previously welded, as shown in FIG. 9G and then decreases in power until the laser eventually decouples from the sheets 44/46. The gradual ramp-down in power prevents the formation of an undercut terminal portion in a laser weld which otherwise occurs when the laser power is terminated abruptly.

Figure 4:
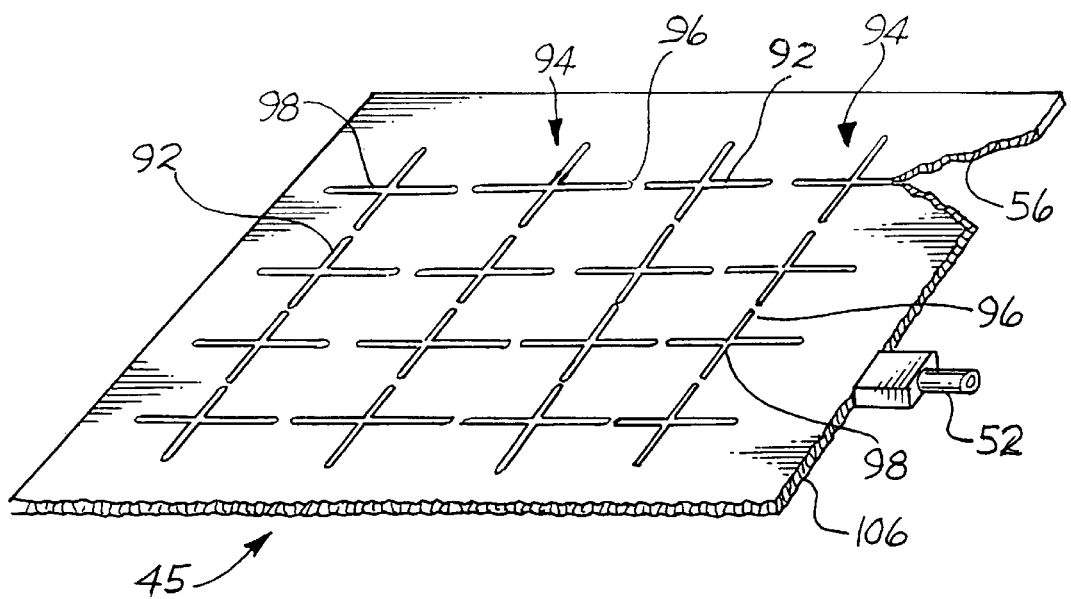
FIG. 4 is a perspective view of the core pack shown in FIG. 2.

The weld pattern, shown schematically in FIGS. 2 and 4, is in the form of a series of orthogonally aligned crosses 94, or considered differently, is a grid pattern with interruptions or gaps 96 in the weld lines midway between each intersection 98 in the weld lines. The gaps 96 in the weld lines 92 provide a passage through which forming gas can flow when the core pack 45 is superplastically formed by heating-to about 1650° F. in a die and injecting forming gas through the core gas fitting 52, as illustrated schematically in FIG. 5. When the core pack 45 is inflated, the gaps 96 open to provide near circular openings 100 in webs 36 formed by the material of the top and bottom core sheets 44 and 46 as the material stretches superplastically away-from the laser welds 92.

After the grid pattern is laser welded into the sheets 44 and 46, the sheets 44 and 46 are seal welded completely around their periphery and around the core gas fitting 52 to fully seal the periphery of the core pack 45. A convenient type of welding for this purpose is gas tungsten arc welding wherein the welding arc can be directed into the edge face of the sheets 44 and 46. A conventional stainless steel compression coupling such as a Swagelock coupling (not shown) is attached to the gas fitting 52, and one end of a short length of stainless steel gas tubing is attached to the compression coupling. The other end of the tube is pinched shut and welded closed to seal off the interior of the core pack 45 against intrusion of cleaning solution for the following cleaning operation.

The sealed core pack 45 is cleaned by immersion in the alkaline bath and the pickling bath as describe above and surfaces which are to be diffusion bonded are wiped with a fabric wad wetted with punctilious alcohol, as also described above. The cleaned core pack 45 is assembled between the cleaned face sheets 48 and 50, with the envelope gas fitting 54 positioned in the notch 56. The hardpoints 40 and 41 are positioned over the core pack 45 at the desired locations and are pinned in place by pins 104. The hardpoints 40 and 41 are made up by two half blocks 106 and 108 positioned one each on each side of the core pack 45 and pinned with the pins 104 through the blocks 106 and 108 and through the core 45, after which the pins are welded in position. The face sheets 48 and 50 are laid over the core pack 45 and half blocks 106 and 108 and the full sandwich pack 47 is sealed around the outside peripheral edge 53 by TIG welding. As shown in FIG. 10, the face sheets 48 and 50 are flexible enough to be flexed inward enough to contact the core pack 45 for welding in a single peripheral weld. If the hardpoint blocks 106 and 108 are too thick or too near the edge to permit the face sheets 48 and 50 to be flexed inward to be clamped and welded to the core pack 45 as shown in FIG. 10, the face sheets 32 and 34 may be preformed to provide bulges or bubbles over the half blocks 106 and 108. Alternatively, a pair of peripheral frame halves 170 and 172 may be used as a sealing spacer between the top and bottom face sheets and the core pack 45, as described in detail below in conjunction with FIG. 15. The two separate top and bottom peripheral frame halves are positioned with the top frame half lying between the core pack 45 and the top sheet 48 and the bottom frame half lying between the core pack 45 and the bottom face sheet 50.

The periphery of the two face sheets 48 and 50 plus the core pack 45 is seal welded at 53 all around, and the envelope gas fittings 54 are seal welded to the sandwich envelope 42 to produce a full pack 110 which is completely sealed, except for the gas flow path provided into the envelope pack 42 between the face sheets 48 and 50 through the envelope gas fitting 54 and the notch 56. The full pack is now ready for superplastic forming and diffusion bonding to produce the expanded metal sandwich structure with integral hardpoints in accordance with this invention. The process is schematically illustrated in FIGS. 11A–E and described below.

The external surfaces of the pack 110 are coated with a parting agent, such as the boron nitride stop-off described above. Compression fittings are attached to the gas fittings 52 and 54 and gas lines from a forming gas control system, such as that described in U.S. Pat. No. 5,419,170 to Sanders et al. are connected to the compression couplings. The full pack is purged with dry inert gas, such as argon, to remove air and moisture from inside the envelope pack 49 and the core pack 45. This may be accomplished with several cycles of alternate vacuum suction and backfilling with. argon under a pressure of about 0.5 PSI in the envelope pack 49 and about 10 PSI in the core pack 45, until the interior of the packs two nested envelopes may each be provided with two gas fittings and dry inert gas such as argon may be pumped in one fitting in each envelope and exhausted out the other fitting. The packs 45 and 49 are now pressurized with argon to separate the surfaces from each other. The pressure inside the core pack 45 is preferably higher than the pressure in the envelop pack 49 because the grid welds 92 tend to hold the core sheets 44 and 46 together more tightly than the peripheral weld holds the face sheets 48 and 50 together, due to the smaller radius on the core pack 45. The initial pressure is about 0.1 PSI in the skin zone within the envelope pack 49 and about 10 PSI in the core pack 45. This provides sufficient pressure to prevent contact and premature diffusion bonding between the facing surfaces of the sheets, but not so high as to cause premature pillowing of the-core envelope or tearing of the sheets at the laser welds or the peripheral welds. The pressurized pack 110 is placed in a die 112 that is preheated to about 1600° F., and the die is closed and held closed with a superplastic forming press (not shown) against pressure of forming gas that will be used to superplastically deform the elements of the core pack and envelope pack. The die may be provided with grooves extending from an internal cavity to the exterior in which the gas fittings 52 and 54 lie to avoid squeezing shut the gas passages through the flange 58. After closing the die, the pressure of the forming gas in the envelope pack 49 is immediately increased to ensure expansion of the face sheets 48 and 50 away from the core. pack 45, and the pressure in the core pack 45 is also increased to resist the compression of the gas pressure in the envelop pack 49.

Figure 12A:
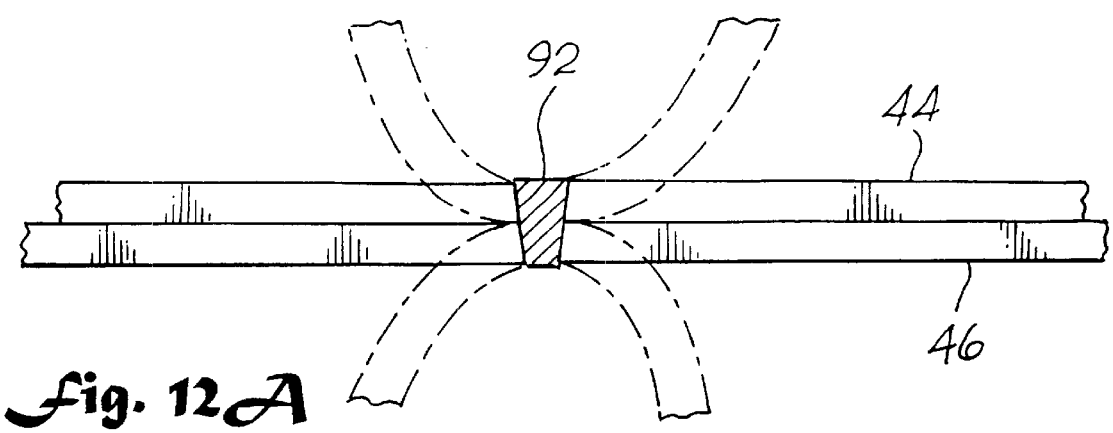
FIGS. 12A–12C are sectional elevations of the core pack shown in FIG. 4 in the region of one of the laser welds, showing several stages in the formation of the webs.
Figure 12B:
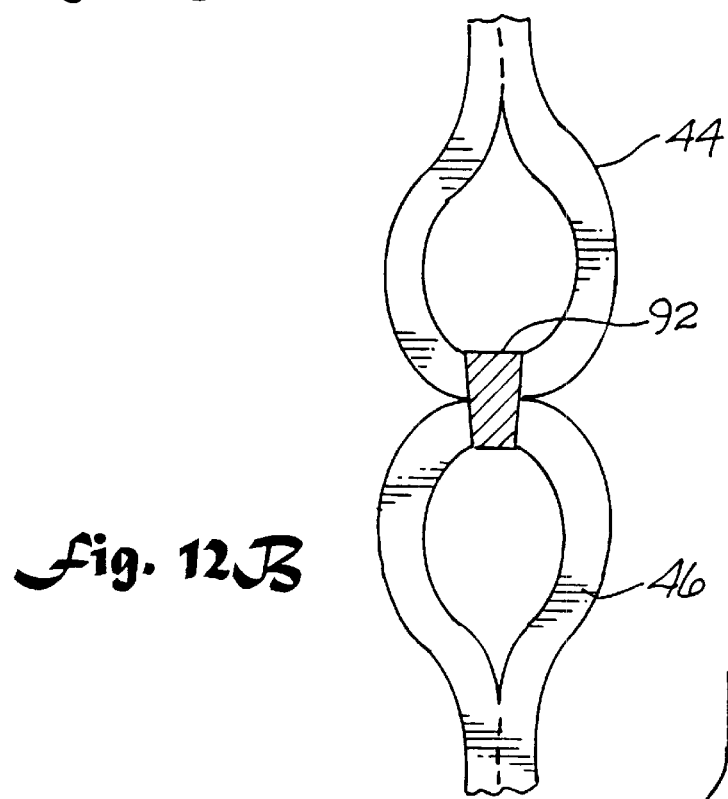
Figure 12C:
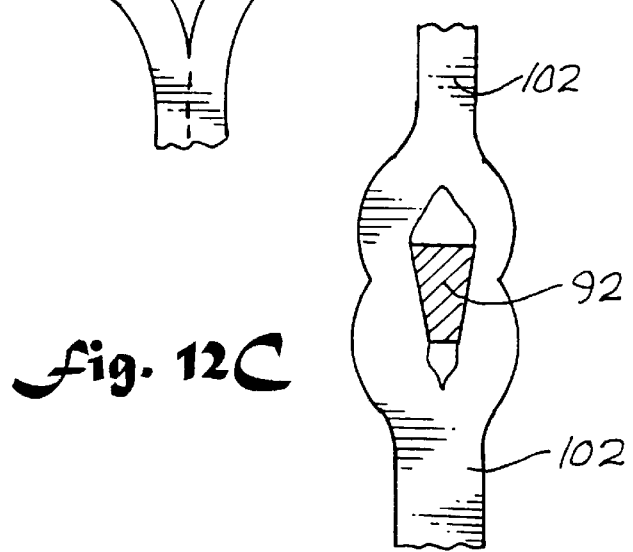
Figure 13:
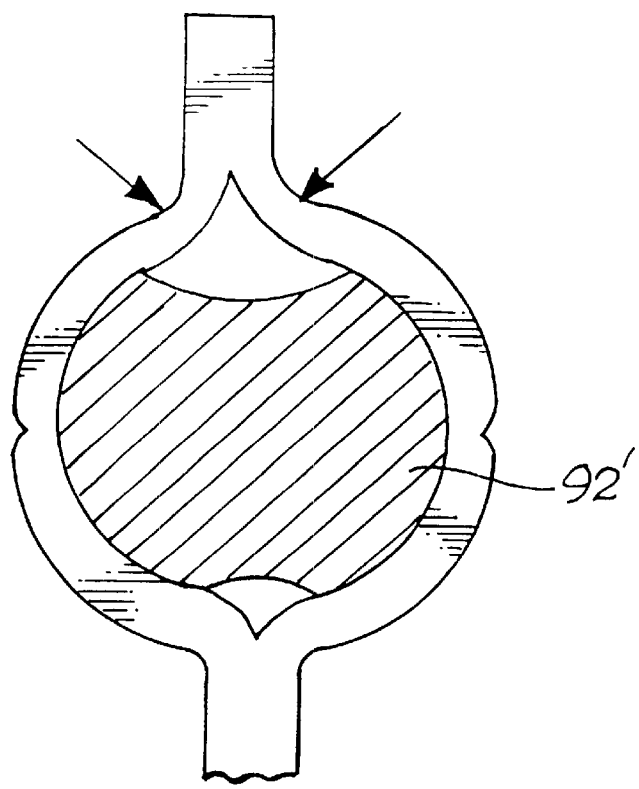
FIGS. 13 and 14 are sectional elevations of webs formed around resistance and laser welds, respectively, on a core pack.
Figure 14:
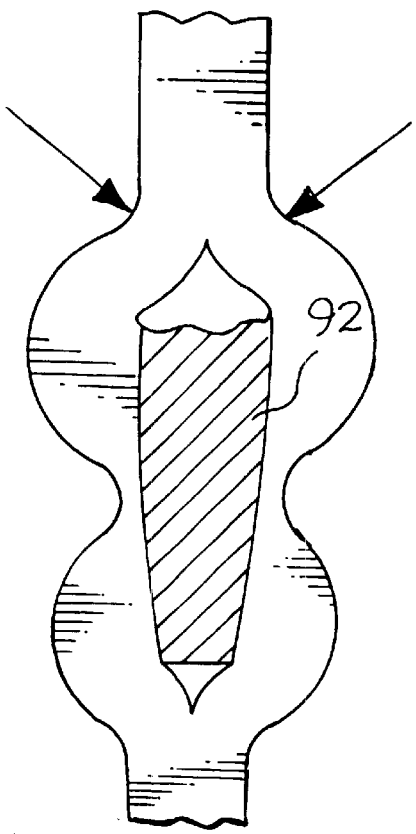

After the pack reaches forming temperature inside the die 112, the pressure in the envelope pack 49 and the core pack 45 is increased to forming pressure, and the sheets 44, 46, 48 and 50 superplastically elongate as shown in FIGS. 11C and 11D, and diffusion bond as shown in FIGS. 11D and 11E. The superplastic forming of the core sheets 44 and 46 around the laser welds 92 is shown in FIGS. 12A–C and in FIGS. 5 and 11. The narrow width of the laser weldment 92 provides a small region around which the sheets 44 and 46 must wrap when they fold back over the weldment 92 to diffusion bond together to form the web 36. This is contrasted with a relatively wide weldment 92' shown in FIG. 13 that is made with a conventional resistance-welding wheel. In the web 36' shown in FIG. 13, the thinning in the region above and below the weldment 92' can be seen to be considerably greater than it is for the laser weldment 92 shown in FIG. 14.

After the pack 110 is fully formed, as shown in FIG. 11E, the pressure is reduced to near ambient, about 0.1 PSI and the press is opened to open the die 112. The sandwich part is removed from the die cavity 114 and is allowed to cool while the gas pressure is maintained slightly above ambient to prevent the cooling part from pulling a vacuum and collapsing under air pressure. After cooling below 900° F., and preferably under 500° F., the gas lines are removed from the compression couplings, and the part is sealed with pinched and welded gas lines in the couplings for recleaning any external alpha case that may have formed on the part from high temperature contact of the external surfaces with air. After cleaning, the part may be trimmed to remove the gas fittings 52 and 54, and the part is complete.

If it is desired to have sealed through openings in the part, the full pack 110 may be laser welded in a circle around the region where the opening is to be located. The interior of that region may be cut out with a laser cutter, which uses the same laser and table 60, but uses a high pressure gas nozzle instead of the gas flood nozzle shown in FIG. 7. The full pack is placed on a protective mat to prevent cutting or splattering of the surface of the table 60 when the laser cuts through the pack when cutting out the hole in the center of the seal weld region. A sleeve having the same height as the sandwich structure part is inserted in the opening cut out by the laser, and the full pack 110 with the sleeves installed in the openings is placed in the die cavity 114 and is superplastically formed around the sleeves. If the sleeve is a non-superplastic material such as stainless steel, it may be removed or retained, whichever is desired for the application. If a superplastic material such as titanium is used, it will diffusion bond in place in the opening and form the interior of the opening. The sleeve may be provided with a threaded insert for threaded connection to the part later, or the "sleeve" may be a solid titanium slug that can be drilled and tapped after the part has been formed for a connection hardpoint to the sandwich structure.

Figure 16:
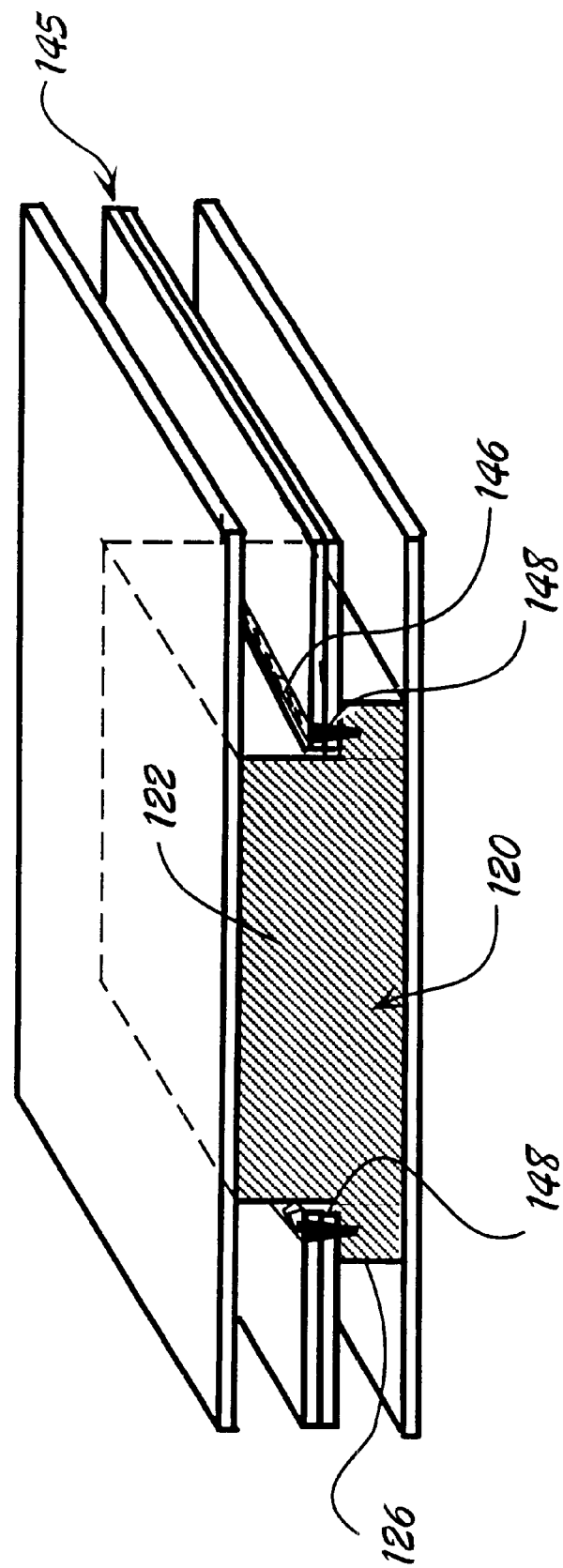
FIG. 16 is a perspective view of a stepped block version of a metal sandwich structure in accordance with this invention.

Turning now to FIG. 16, another embodiment of the four sheet expanded metal sandwich structure is shown having a stepped block 120 having an upper portion 122 and a longer, wider lower portion 124, meeting at an intermediate ledge or shoulder 126 providing an upwardly facing surface to which a core pack 145 is laser welded along a continuous peripheral weld line 146 that completely encircles an opening 148 cut in the core pack to receive the upper. portion 122 of the stepped block 120. The core pack 145 is otherwise identical to the core pack 45 in the embodiment of FIGS. 2 and 4 and the core pack fabrication procedures are the same. The opening 148 in the core pack 145 can be cut after the core pack is cleaned, or it can be laser cut and sealed prior to cleaning. The webs 36 for the stepped block embodiment of FIG. 16 are identical to those shown in FIGS. 2 and 3.

Figure 15:
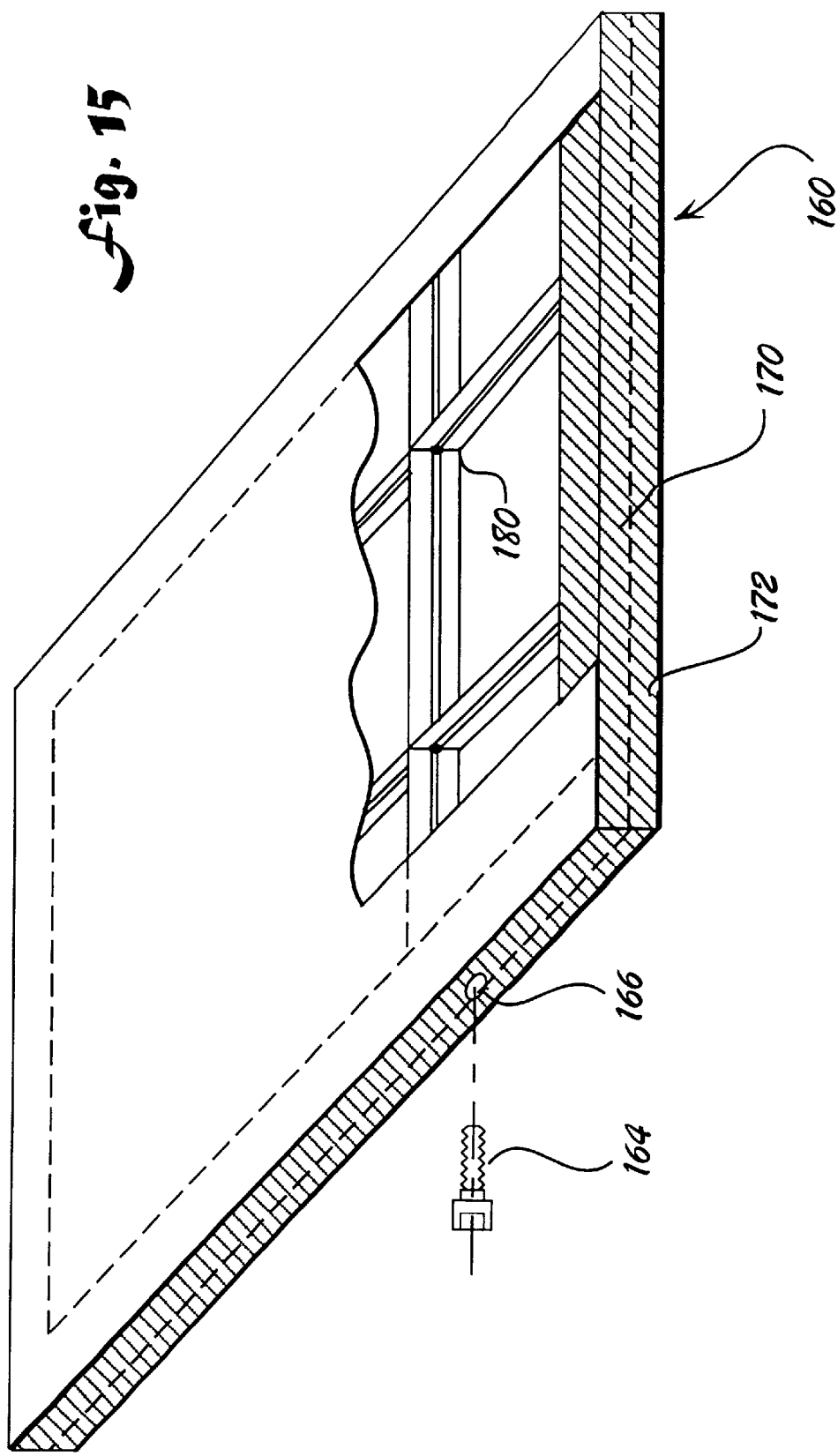
FIG. 15 is a perspective view of a peripheral frame version of a metal sandwich part, partially broken away to show the interior space inside the panel showing the webs.

Another embodiment of the invention, shown in FIG. 15, has an integral peripheral frame 160 around the outside peripheral edge of the sandwich structure. The peripheral edge provides a solid edge structure by which the sandwich structure may be fastened to adjacent structure in the assembly of which it is a part by suitable fasteners, such as the machine screw 164 shown exploded out of a tapped hole 166 in the edge of the peripheral frame 160.

The peripheral frame, 160 may be made using the split block technique shown in FIGS. 2, 3 and 11. The frame 160 is made up of two separate continuous upper and lower frame halves 170 and 172 laid over and under the core pack 45 which is identical to the core pack 45 shown in FIGS. 2. and 4. The fitting 52 and 54 may be used as described for FIGS. 2 and 4, or separate upper and lower envelope gas fittings 54 may be conveniently provided in the frame halves 170 and 172 for pressurizing the space between the core pack 45 and the face sheets 32 and 34. The face sheets are laser welded to the peripheral frame halves 170 and 172, respectively, and the core pack 45 and faying peripheral edges of the frame halves are TIG welded together to seal the junction of the frame halves and the core pack 45. Conveniently, the peripheral frame could be made as a single stepped structure, providing a step to which the peripheral edge of the core pack 45 would be welded in a manner similar to that shown in FIG. 16.

If needed, interior hardpoints may be placed in the central area of the part, as shown in FIG. 1 and 2, to provide a central connection point for actuator connection or the like, as shown in FIG. 1. The part is superplastically expanded and diffusion bonded as described for the embodiment of FIG. 2, and the edge of the part is trimmed to remove the edge welding and provide a smooth flat edge with a continuous peripheral close-out. Fastener holes or other attachment surfaces may then be machined in the peripheral frame 160.

The separation of the top and bottom face sheets 32 and 34 from the corepack 45 provided by the peripheral frame 160 makes possible an improvement in the core forming process which solves a corner thinout problem that has plagued manufacturers of the four sheet metal sandwich structures for years. The thinout problem is an excessive thinning of the web 36 where it joins the top and bottom sheets 32 and 34 at the corners 180 of the cells 38. The thinout is a consequence of the core sheets 44 and 46 sticking to the face sheets 32 and 34 when the core 45 is inflated at superplastic temperatures. The portions of the core sheets 44 and 46 that are stuck to the face sheets 32 and 34 can no longer elongate superplastically so all additional elongation thereafter is done in the portions of the core sheets 44 and 46 that are not yet in contact with the face sheets 32 and 34. The consequence is increasing thinout of the core sheets 44 and 46 as they are formed toward the corners 180. The conventional solution to the problem is to use core sheets that are thick enough to produce adequate corner thickness even after such thinout. However, this technique results in thicker webs 36 and top and bottom sheets than is otherwise necessary, and more weight than desired.

Figure 17:
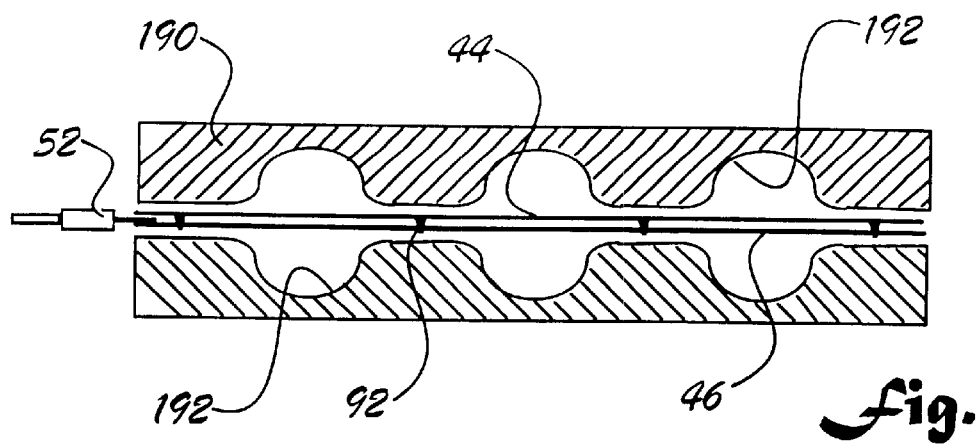
Figure 18:
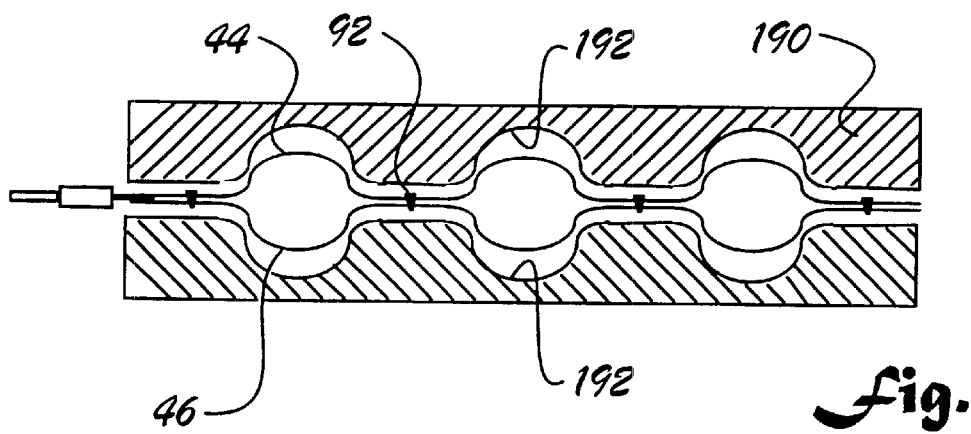
Figure 19:
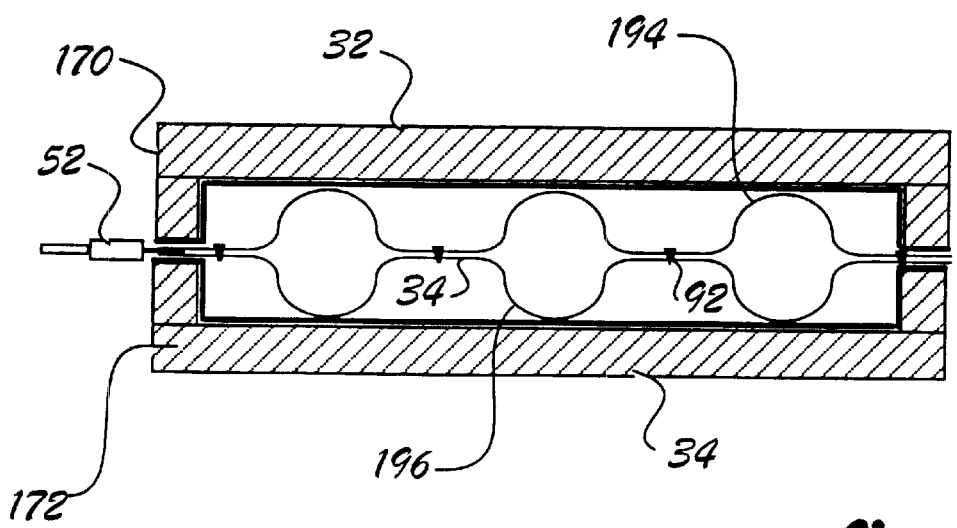

The corner thinout problem is solved by prethinning the core sheets 44 and 46 in the central areas of the cells 38 within the weld lines 92, as shown in FIGS. 17–19. The core pack 45 is made normally as shown in FIG. 2, but without the hardpoint blocks 106 and 108. The core pack 45 is placed in a die 190 having pockets 192 located centrally above and below the cells 38 between the weld lines 92. The die 190 has no pocket in central areas where a central hardpoint is to be located. The core pack 45 is heated to superplastic temperatures and is expanded by gas pressure through the gas fitting 52 to form the core sheets 44 and 46 into the pockets 192 in the top and bottom halves of the die 190, forming bulges 194 and 196 in the core sheets 44 and 46, shown partially formed in FIG. 18 and fully formed and assembled in FIG. 19. After forming, the core pack 45 is vented and removed from the die 190. The peripheral frame halves 170 and 172 are assembled to the peripheral edge of the preformed core pack 45, and the face sheets 32 and 34 are laid above and below the frame halves and welded thereto, as shown in FIG. 19.

The assembled pack, shown in FIG. 19, is placed in a die, such as the die 112, and is heated to superplastic temperatures while maintaining a slight gas pressure in the core pack 45 and the envelope pack between the core pack 45 and the face sheets 32 and 34 to maintain separation of the sheets so that premature undesired diffusion bonding does not occur. Since the bulges 194 and 196 are prethinned, when they contact the top and bottom sheets 32 and 34 and stick thereto, the intermediate portions of the core sheets 44 and 46 between the welds 92 and the bulges 194 and 196 remain at full or nearly full thickness, so when those intermediate portions are formed up into the corners 180, they ,retain sufficient thickness to provide the strength required to withstand the stresses that are concentrated at those locations.

Figure 22:
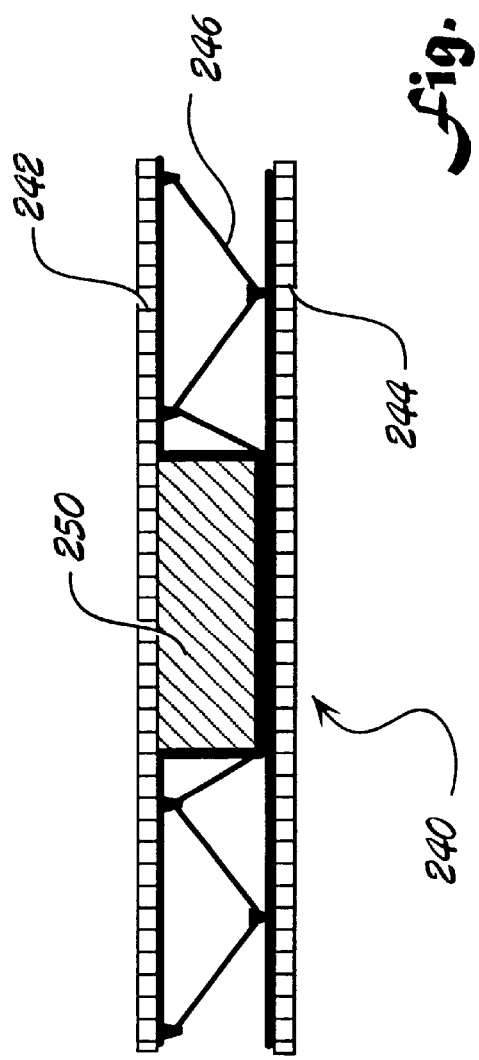

Turning now to FIGS. 21 and 22, a five-sheet metal sandwich structure 200 is shown having top and bottom sheets 202 and 204 defining therebetween an open interior space, and a plurality of truss webs 206 joined to the top and bottom face sheets 202 and 204 and spanning the interior space to couple the top and bottom sheets and stiffen the structure 200. A hardpoint 210 lies between the face sheets 202 and 204 and is integrally joined to and couples the face sheets 202 and 204 and also the truss webs 206. The hardpoint 210 provides a substantial structure by which the structure 200 can be attached to other adjacent structure in the assembly, such as an actuator for moving the structure 200, or to adjacent parts to which it is to be connected in a rigid assembly. The hardpoint 210 can tolerate high stress loads and transfers the loads evenly to the top and bottom face sheets 202 and 204 and to the truss webs 206 to avoid high stress concentrations on the thin sheets in the structure 200.

As shown in FIG. 21, the structure 200 is made from a three sheet core pack 214, top and bottom face sheets 202 and 204, and top and bottom half blocks 216 and 218. The core pack 214 is made up of three sheets of metal having superplastic and diffusion bonding capabilities, such as titanium alloy described above, which is cleaned and welded with partial penetration laser welds in a pattern shown in FIG. 21. A full penetration laser weld 220 is made around the area covered by the half blocks 216 and 218 to isolate the interior of the core pack 214 in that area from forming gas pressure to prevent undesired gas flow through holes by which the half blocks are pinned to the core pack 214. A gas fitting is welded into the pack 214 for connection through a gas pressure control system, described above, to a source of forming gas such as Argon under pressure. The pack 214 is seal welded around its entire periphery and is cleaned as described above.

An envelope pack 222 is, assembled as shown in FIG. 21 from the core pack 214, the two half blocks 216 and 218, and the face sheets 202 and 204. The half blocks are pinned to the core pack 214 by accurately positioning them at the desired location and drilling a pair of holes 224 through the half blocks and the core pack, and driving a pin through the holes 224 to lock the half blocks in position.

The face sheets 202 and 204 are seal welded around their outside periphery to the outside periphery of the core pack 214. If the half blocks are thin enough, the face sheets 202 and 204 may be flexed inward to the core pack 214 and seal welded thereto around an envelope gas fitting like the gas fitting 54, communicating with the space between the core pack 214 and the face sheets 202 and 204. Alternatively, the face sheets 202 and 204 may be preformed as indicated at the right side of FIG. 21 with a peripheral lip 226 that can be seal welded to the core pack 214 and a wall section 228 by which the central portion of the face sheets 202 and 204 is made to stand off from the half blocks 216 and 218. A further alternative is to use a peripheral frame 160 as shown in FIG. 15 to hold the face sheets 202 and 204 spaced from the core pack 214 during, forming. The gas fittings are connected to the gas control system and the internal spaces within the core pack 214 and the envelope pack 222 are purged of oxygen by flushing with argon.

The envelope pack 222 is placed in a die having a forming cavity with internal die cavity surfaces shaped like the outside mold line of the part to be made. The core pack 214 and the envelope pack 222 are slightly pressurized with argon through gas fittings (not shown) communicating from a gas control system with the interior of the core pack 214 and communicating from the gas control system with the interior of the envelope pack 222 in the space between the face sheets 202 and 204 and the core pack 214, to ensure that the sheets are separated, except where they are welded together. The die is closed, pinching the peripheral edge of the envelope pack and pressing the top and bottom face sheets 202 and 204 against the top and bottom surfaces of the half blocks 216 and 218, and pressing the half blocks against the core pack 214. The high heat and pressure causes diffusion bonding of the top and bottom face sheets 202 and 204 to the half blocks 216 and 218, and diffusion bonding of the half blocks to the sheets of the core pack 214 between the half blocks. The result is an integral monolithic hardpoint 210 with no discernable junction lines where the several elements of the structure 200 are joined together.

After the envelope pack 222 has reached superplastic temperature in the die, the gas pressure is increased to expand the face sheets against the die cavity surfaces and to expand the core pack outward against the face sheets 202 and 204 as shown in FIG. 20. The space between the core sheets and the face sheets 202 and 204 is vented or evacuated through the gas fitting communicating with that space and the gas pressure to the core pack is increased to exert pressure on the top and bottom core sheets to press them against the face sheets 202. and 204 to facilitate diffusion bonding. The diagonal webs 206 project from the middle of the hardpoint 210 and are diffusion bonded thereto to further spread the load exerted on the hardpoint evenly through the-sandwich structure 200. After diffusion bonding is complete, the gas pressure is-lowered and the die is opened to remove the part from the die cavity. The part is complete except for edge trimming and machining or drilling attachment surfaces such as holes or the like in the hardpoint 210.

Naturally, as many hardpoints as are needed may be made in the part 200 and a peripheral hardpoint in the form of a peripheral frame 160 may be made in the structure 200 if a solid peripheral close-out or edge attachment structure are desired, independently of the standoff function provided by the peripheral frame. The hardpoints may be machined in any desired way to provide recesses for flush mounting of fasteners or other attachment hardware, such as the shackle shown exploded out of its recess in the hardpoint 40 in FIG. 1. They may also be drilled and tapped for receiving threaded fasteners, or drilled to receive bolts which can be torqued tight to preload the fastener in tension for secure attachment without crushing the sandwich structure, since the hardpoint has sufficient compressive strength to react the tensile force exerted by the bolt.

Figure 23:
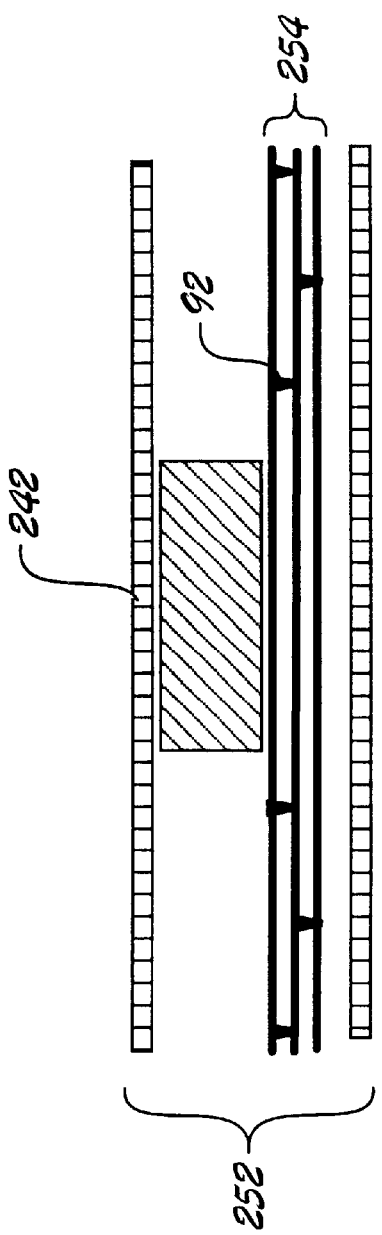
FIGS. 22 and 23 are sectional elevations showing two stages of variant of the truss core forming process shown in FIGS. 20 and 21.

Turning now to FIGS. 22 and 23, an expanded metal truss core sandwich structure 240 is shown having a top face sheet 242 and a bottom face sheet 244 defining therebetween an open space. A plurality of webs 246 extending diagonally between the face sheets 242 and 244 couples the face sheets and stiffens the structure 240. A hardpoint 250 is interposed between and diffusion bonded to the face sheets 242 and 244, providing an attachment structure by which the sandwich structure 240 may be attached to adjacent parts of a larger assembly, as explained above. The diagonal webs 246 are also diffusion bonded to the hardpoint 250 to further spread attachment loads throughout the sandwich structure without over stressing an attachment point.

The sandwich structure shown in FIG. 22 is formed from an envelope pack 252 shown in FIG. 23 having a core pack 254 and the two face sheets 242 and 244. The core pack 254, is assembled and welded in the same manner described above for the core pack 214 of the embodiment of FIGS. 20 and 21. A single block 250 lies between the top face sheet 242 and the core pack 254, and the core pack 254 lies in contact with the bottom face sheet 244.

The assembled envelope pack 252 is seal welded around the periphery and is purged of air through gas fittings as described above for the embodiment of FIGS. 20 and 21, and is slightly pressurized with dry argon to separate the sheets from each other inside the pack 252 to prevent premature diffusion bonding in the die. The sealed envelope pack 252 is inserted in a superplastic forming die and raised to superplastic temperatures therein.

When superplastic temperatures of about 1600° F. are reached, the gas pressure in the pack is increased to increase the separation between the sheets and begin forming the face sheets against the interior surfaces of the die cavity. At the same time, the die is exerting mechanical pressure on the stack-up of face sheets 242 and 244, the hardpoint 250, and the core pack 254 to cause diffusion bonding between the faying surfaces of those elements in that stack-up.

When the face sheets are fully formed against the die cavity surfaces, the gas pressure within the core pack 254 is increased through the core pack gas fitting and is conveyed uniformly throughout the core pack through suitable openings left between or around the weld lines 92. The core pack expands superplastically against the face sheets 242 and 244, pulling the center core sheet into the diagonal truss web structure 246 shown in FIG. 22. The top and bottom sheets of the core pack 254 diffusion bond to the top and bottom face sheets 242 and 244, respectively, and the top face sheet diffusion bonds to the sides of the hardpoint 250 forming an integral structure through which internal stresses in the sandwich structure 240 may flow evenly without stress concentrations at any particular point.

After diffusion bonding is completed, the pressure is reduced to near atmospheric. The gas fittings are not opened to avoid the aspiration of oxygen into the hot core of the part 240 until it is cool. A slight pressure is maintained in the core to prevent the cooling part from pulling a vacuum and buckling under atmospheric pressure. The die is opened and the part is removed from the die while still hot so that another part may be made without wasting heat from the die.

Obviously, numerous modifications and variations of the preferred embodiments described above will occur to those skilled in the art in-light of this disclosure. Thus, it is expressly to be understood that these variations and modifications, and the equivalents thereof, are to be considered to be within the spirit and scope of the invention as defined in the following claims, wherein we claim:

What is claimed is:

1. A method of making a superplastically formed, diffusion bonded sandwich structure with an integral metal hardpoint for attachment of said sandwich structure to other structure, comprising:

joining at least three superplastic metal sheets together into a pack by welding or diffusion bonding along a pattern of lines which form junction lines between said sheets when said pack is inflated by gas pressure at superplastic temperatures;

interposing at least one metal block insert between at least two of said sheets, said metal insert forming said hardpoint when said sheets and said insert are diffusion bonded together onto said insert;

sealing all of said sheets in said pack together around an outside peripheral edge to create a gas tight envelope;

heating said pack to superplastic temperatures and diffusion bonding at least two of said sheets to top and bottom surfaces of said metal insert inflating said pack at superplastic temperatures against inside surfaces of a die by injecting gas under pressure through a gas line in said peripheral edge to form an expanded metal sandwich structure having upper and lower face sheets in contact with said inside surfaces of said die, and having integral webs and an integral hardpoint formed by said metal block insert spanning the space between said face sheets and diffusion bonded thereto, thereby coupling said upper and lower face sheets and providing a load path between said face sheets through said metal block insert for forces exerted by fasteners connecting said sandwich structure to said other structure;

venting said gas pressure, cooling said expanded metal sandwich structure, and removing said expanded metal sandwich structure from said die; and drilling holes in said sandwich structure in alignment with said metal insert through at least one of said sheets and into said metal insert for receiving said fasteners by which said sandwich structure can be attached to said other structure.

2. A method as defined in claim 1, wherein:
said diffusion bonding of said two sheets to said top and bottom of said metal insert is by application of heat and pressure from top and bottom inner surfaces of said die cavity.

3. A method as defined in claim 1, wherein:
said pack includes three of said sheets, and said insert is interposed between a face sheet and a core sheet of said pack.

4. A method as defined in claim 1, wherein:
said inflating of said pack includes inflating said upper and lower face sheets against said upper and lower inside surfaces of said die cavity, and expanding a core pack, having at least two core sheets welded together along function lines, against inside surfaces of said upper and lower face sheets and diffusion bonding said core thereto.

5. A method as defined in claim 4, wherein:
said pack includes an upper face sheet, a lower face sheet, and a core of an upper core sheet and a lower core sheet joined together by welding or diffusion bonding along said pattern of lines that will form said junction lines;
said insert includes an upper lower half block and a lower half block;
said upper half block is interposed between said upper face sheet and said upper core sheet; and
said lower half block is interposed between said lower core sheet and said lower face sheet of said pack.

6. A method as defined in claim 5, wherein:
said expanding of said core includes inflating said core to press said upper core sheet upward into contact with said upper face sheet and with a side surface of said upper half block, and to press said lower core sheet into contact with said lower face sheet and with a side surface of said lower half block.

7. A method as defined in claim 6, wherein:
said side surfaces of said upper half block are flared upward and said side surfaces of said lower half block are flared downwardly to provide a draft angle for smooth transition of forces from said insert to said upper and lower face sheets and said webs formed by said core sheets.

8. A method as defined in claim 1, wherein said heating and pressure steps are on a cycle that includes:
a) heating said pack in said die until the temperature of said pack is between 1500° F. and 1750° F.;
b) closing said die and exerting a pressure on said face sheets to squeezes aid face sheets against said insert, and maintaining said pressure at said temperature until said face sheets are diffusion bonded to said insert;
c) injecting said forming gas under a pressure of about 20–600 PSI between said face sheets to form said face sheets away from each other and against said die cavity surfaces at a strain rate suitable for said metal sheets.

9. A method as defined in claim 1, wherein:
said pack includes said three sheets, constituting a core pack, and two face sheets, one on each side of said corepack, constituting an envelope pack encompassing said core pack;
said inflating step includes injecting forming gas into said envelope pack with sufficient pressure to superplastically elongate said face sheets into contact against said die surfaces, and injecting gas into said core pack to expand said core pack and superplastically elongate top and bottom core pack sheets against said face sheets; venting pressure in said envelope pack while maintaining gas pressure in said core pack to press said top and bottom core pack sheets against said face sheets, and maintaining said pressure in said core pack until said face sheets are diffusion bonded to said top and bottom core pack sheets.

10. A method as defined in claim 1, wherein:
said sealing of said sheets around said outside periphery is by seal welding.

11. A method as defined in claim 10, wherein:
said metal insert is pinned to said one metal sheet to hold said insert in position while said pack is assembled and seal welded around said outside periphery.

12. An expanded metal sandwich structure having integral internal stiffening webs and at least one integral metal hardpoint, comprising:
a top sheet of superplastic metal, and a bottom sheet of superplastic metal, said top and bottom being spaced apart and defining therebetween an enclosed internal space within said sandwich structure;
a plurality of webs integrally joined with and joining said top and bottom sheets, said webs spanning said enclosed internal space;
at least one metal block insert integrally joined with said top sheet and said bottom sheet and spanning said enclosed internal space, said insert forming a hardpoint for providing a load path between said top and bottom sheets for distributing forces exerted on said sandwich structure by attachment hardware by which said sandwich structure is connected to adjacent structure; and
a plurality of fastener holes through at least one of said sheets and at least partially into said metal block hardpoint for receiving fasteners by which said sandwich structure can be attached to other structure.

13. An expanded metal sandwich structure as defined in claim 12, wherein:
said metal insert is also integrally joined to at least one of said webs and forms a load path between said web and said hardpoint for distributing said forces exerted on said sandwich structure by attachment hardware by which said sandwich structure is connected to adjacent structure.

14. An expanded metal sandwich structure as defined in claim 13, wherein:
said metal insert is joined to said web and said top and bottom sheets by diffusion bonding.

15. An expanded metal sandwich structure as defined in claim 14, wherein:
said insert is a metal block in which attachment surfaces are machined for receiving said attachment hardware by which said expanded metal sandwich structure is attached to adjacent structure.

16. An expanded metal sandwich structure as defined in claim 13, wherein:
said insert is superplastic material and conforms to said space between said top and bottom sheets when said die is closed and exerts pressure through said top and bottom sheets on said insert.

17. An expanded metal sandwich structure as defined in claim 12, wherein:
said insert is a single block fitted into an opening cut through a pair of core sheets from which said webs are formed.

18. An expanded metal sandwich structure as defined in claim 17, wherein:

said core sheets are integrally joined to said block.

19. An expanded metal sandwich structure as defined in claim 13, wherein:

said hardpoint includes a peripheral frame surrounding said metal sandwich structure and existing as an outside edge thereof, joined to and extending between said top and bottom sheets, and integrally joined to said webs.

20. An expanded metal sandwich structure as defined in claim 13, wherein:

said webs are in the form of diagonal truss webs extending at an angle between said top and bottom face sheets and connected to said hardpoint.

21. A structural assembly comprising:

an expanded metal sandwich part and adjacent structure to which said sandwich part is attached;

said expanded metal sandwich part including a top sheet, a bottom sheet spaced from said top sheet, integral webs spanning said space between said top and bottom sheets and joined integrally thereto, and an integral metal block hardpoint integral with said top and bottom sheets, said hardpoint providing a load path between said top and bottom sheets for distributing forces exerted on said sandwich structure by attachment hardware by which said sandwich structure is connected to adjacent structure; and fastener holes through at least one of said sheets and at least partially into said hardpoint for receiving fasteners for attaching said expanded metal sandwich part by way of said hardpoint to said adjacent structure.

22. A structural assembly as defined in claim 21, further comprising:

engagement surfaces in said hardpoint engaged by attachment hardware extending between said adjacent structure and said metal sandwich part, said attachment hardware existing in a state of tension to securely fasten said adjacent structure and said part together.

23. A structural assembly as defined in claim 22, wherein:

said hardpoint is in the form of a peripheral frame encircling said part as a peripheral structure thereof.

24. A structural assembly as defined in claim 23, wherein:

said peripheral frame has a continuous peripheral edge surface extending around said part and directly connecting and integrally joined to outer peripheral edges of said top and bottom sheets, said peripheral edge of said frame constituting a closeout of said part flush with said two outer peripheral edges of said top and bottom sheets.

25. A structural assembly as defined in claim 24, wherein:

said engagement surfaces include a hole opening in said continuous peripheral edge of said peripheral frame for receiving a fastener by which said part is attached to said adjacent structure.

26. A structural assembly as defined in claim 23, wherein:

said webs are integrally connected to said peripheral frame and couple forces from said adjacent structure through said frame to said top and bottom sheets and through said part, thereby avoiding stress concentrations at attachment points on said part.

27. A structural assembly as defined in claim 22, further comprising:

recesses machined in said hardpoint for receiving said attachment hardware in a recessed position within outer surfaces of said top and bottom sheets.

28. A method of attaching a superplastically formed, diffusion bonded sandwich structure to adjacent structure, comprising:

selecting a superplastically formed, diffusion bonded sandwich structure having a top sheet, a bottom sheet spaced from said top sheet and defining therebetween an internal space, integral webs spanning said internal space and joined integrally to said top and bottom sheets, and a metal hardpoint integral with said top and bottom sheets and with portions of said webs;

machining an opening through at least one of said sheets and at least partially into said integral metal hardpoint for receiving attachment hardware for attaching said sandwich structure to said adjacent structure;

inserting said attachment hardware into said opening, and engaging surfaces in said opening with said attachment hardware; and attaching said attachment hardware to said adjacent structure to attach said sandwich structure to said adjacent structure and to establish a load transfer path between said sandwich structure and said adjacent structure that distributes loads therebetween evenly in said sandwich structure.

29. A method as defined in claim 28, wherein:

said opening is a hole drilled through said hardpoint;

said attachment hardware is a bolt extending through said hole and through another hole in said adjacent structure and fastened with a nut tightened to exert a tensile force holding said adjacent structure to said sandwich structure, said hardpoint having sufficient compressive strength to react said tensile force exerted by said nut and bolt.

30. A method as defined in claim 28, wherein:

said opening is a hole drilled into said hardpoint and tapped with helical threads;

said attachment hardware is a machine screw extending into said hole and through another hole in-said adjacent structure, said machine screw having helical threads engaged with said hole helical threads and torqued down to exert a tensile force holding said adjacent structure to said sandwich structure said hardpoint having sufficient strength to react tensile force exerted by said machine screw.

31. A method as defined in claim 28, wherein:

said hardpoint includes a peripheral frame surrounding said sandwich structure and constituting a peripheral edge thereof.

32. A method as defined in claim 31, wherein:

said peripheral frame is a continuous structure and constitutes an upstanding peripheral close-out around said sandwich structure.

33. A method as defined in claim 31, wherein:

said hardpoint is positioned along one edge of said sandwich structure, and said opening is a hole drilled in a side-facing edge of said peripheral frame for receiving said attachment hardware.

34. A method as defined in claim 33, wherein:

said hole in said side-facing edge of said peripheral frame is tapped to produce helical threads constituting said surfaces in said opening for engagement by a threaded fastener comprising said attachment hardware.

35. A method as defined in claim 28, wherein:

said hardpoint includes two half blocks located inside said internal space, said two half blocks being diffusion bonded to said face sheets and to a core sheet forming said webs to form an integral unitary structure.

36. A method as defined in claim 28, wherein:

inserting said attachment hardware in a recess machined in said hardpoint for receiving said attachment hardware within inner and outer mold lines defined by outer surfaces of said top and bottom sheets.

37. A method as defined in claim 28, wherein:

said attachment hardware includes fasteners holding one leaf of a hinge to said hardpoint, said hinge having another leaf attached to said adjacent structure, said hinge attaching said sandwich structure to said adjacent structure for rotating relative thereto.

38. A method of making a metal sandwich structure having two spaced face sheets defining on outside surfaces an outer mold line, and on inner surfaces therebetween an open space, and a plurality of webs spanning said open space and coupling said two face sheets, comprising:

preforming two core sheets of a core at selected areas in the central area of cells of said core in a bubble to prethin said core sheets in said selected areas;

assembling said face sheets and said core into a pack with said face sheets encompassing said core;

inserting a first gas fitting communicating from outside said pack to core interior space within said core between said core sheets, and inserting a second gas fitting communicating from outside said pack to pack interior space within said pack between said core and said face sheets;

sealing said face sheets and said core together around an outside peripheral edge of said pack into two nested airtight envelopes including an inner envelope and an outer envelope, said inner envelope comprising said core, and said outer envelope comprising said face sheets;

heating said pack to superplastic temperatures inside a die having a die cavity with interior surfaces shaped like said outer mold line of said metal sandwich structure;

while at superplastic temperatures, inflating said outer envelope against said die cavity interior surfaces by injecting forming gas into said outer envelope through said second gas fitting, and inflating said inner envelope against said outer envelope by injecting forming gas into said inner envelope through said first gas fitting;

diffusion bonding said core sheets around said junction lines to portions of said core sheets on opposite sides of said junction lines, and to said face sheets to produce said webs around said cells;

whereby thinout of said webs at junction regions of said webs and said face sheets is minimized.

39. A method as defined in claim 38, further comprising:

inserting a hardpoint in the form of a peripheral frame between said face sheets and surrounding said core, said peripheral frame constituting a peripheral edge of said sandwich structure;

said peripheral frame having a thickness dimension in a direction perpendicular to the plane of said top and bottom face sheets at least equal to the combined height of said core bubbles;

whereby said peripheral frame maintains a separation between said core bubbles and said face sheets during heating to superplastic temperatures to prevent distortion of said bubbles by said face sheets and premature diffusion bonding at elevated temperatures.

40. A method as defined in claim 38, further comprising:

to assembling said peripheral frame as two separate top and bottom frame halves, said top frame half lying between said core and said top sheet and said bottom frame half lying between said core and said bottom face sheet.

41. A method as defined in claim 40, wherein:

said sealing step includes welding said core sheet, said top and bottom frame halves and said top and bottom face sheets together around outside peripheral edges thereof.

* * * * *